United States Patent
Zalewski

(10) Patent No.: US 9,606,363 B2
(45) Date of Patent: *Mar. 28, 2017

(54) HEAD MOUNTED DEVICE (HMD) SYSTEM HAVING INTERFACE WITH MOBILE COMPUTING DEVICE FOR RENDERING VIRTUAL REALITY CONTENT

(71) Applicant: Sony Computer Entertainment America LLC, San Mateo, CA (US)

(72) Inventor: Gary M. Zalewski, Oakland, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,770

(22) Filed: Mar. 25, 2016

(65) Prior Publication Data
US 2016/0209658 A1 Jul. 21, 2016

Related U.S. Application Data

(63) Continuation of application No. 14/712,886, filed on May 14, 2015.
(Continued)

(51) Int. Cl.
*G09G 5/00* (2006.01)
*G02B 27/01* (2006.01)
(Continued)

(52) U.S. Cl.
CPC ....... *G02B 27/0172* (2013.01); *G02B 27/017* (2013.01); *G06F 3/01* (2013.01);
(Continued)

(58) Field of Classification Search
None
See application file for complete search history.

(56) References Cited

U.S. PATENT DOCUMENTS

| 5,844,530 A | 12/1998 | Tosaki | 345/8 |
| 9,268,136 B1 | 2/2016 | Starner et al. | 345/156 |

(Continued)

FOREIGN PATENT DOCUMENTS

GB 2 499 102 A 8/2013 ............. G02B 27/01

*Primary Examiner* — Xiao Wu
*Assistant Examiner* — Mohammad H Akhavannik
(74) *Attorney, Agent, or Firm* — Martine Penilla Group, LLP

(57) ABSTRACT

Systems, methods and computer readable media are provided for rendering virtual reality content. One example system includes a housing to be attached to a head of a user using a strap that connects to the housing. Display optics are integrated in the housing and are oriented on an internal side of the housing that is configured for orientation toward eyes of the user when the housing is attached to the head of the user. Further, electronics are integrated with the housing and a holder is integrated in the housing. The holder is configured to retain a smartphone. When the smartphone is retained by the holder a screen of the smartphone is oriented toward the display optics of the housing. A connector is integrated in the housing to enable connection of the smartphone to the electronics when the smartphone is retained by the holder. The smartphone includes a camera facing away from the display optics. The screen of the smartphone is configured to render images of a virtual reality (VR) space that is viewable through the display optics, and a program executed by the smartphone is configured to enable the camera to provide a pass-through view of a real world environment. The pass-through view provides images of the real world environment instead of the VR space.

25 Claims, 15 Drawing Sheets

Related U.S. Application Data

(60) Provisional application No. 62/006,022, filed on May 30, 2014.

(51) Int. Cl.
*G06T 19/00* (2011.01)
*G06T 15/00* (2011.01)
*G06F 3/01* (2006.01)
*H04M 1/05* (2006.01)

(52) U.S. Cl.
CPC ............. *G06F 3/011* (2013.01); *G06F 3/012* (2013.01); *G06T 15/00* (2013.01); *G06T 19/006* (2013.01); *H04M 1/05* (2013.01); *G02B 2027/014* (2013.01); *G02B 2027/0132* (2013.01); *G02B 2027/0178* (2013.01)

(56) References Cited

U.S. PATENT DOCUMENTS

| | | | |
|---|---|---|---|
| 2009/0237355 A1 | 9/2009 | Orion et al. | 345/156 |
| 2010/0079356 A1 | 4/2010 | Hoellwarth | 345/8 |
| 2012/0262558 A1* | 10/2012 | Boger | G02B 27/0093 348/61 |
| 2013/0014360 A1 | 1/2013 | Inanami et al. | 29/25.01 |
| 2013/0093788 A1* | 4/2013 | Liu | G06F 3/011 345/633 |
| 2013/0335301 A1* | 12/2013 | Wong | G02B 27/0093 345/8 |
| 2014/0118357 A1 | 5/2014 | Covington | 345/473 |
| 2014/0354782 A1 | 12/2014 | Lowry | 348/49 |
| 2015/0235426 A1 | 8/2015 | Lyons | G06T 19/006 |
| 2015/0241969 A1 | 8/2015 | Elangovan et al. | G06F 3/014 |
| 2016/0011425 A1 | 1/2016 | Thurber et al. | G02B 27/0176 |

\* cited by examiner

HEAD MOUNTED DEVICE (HMD) SYSTEM HAVING INTERFACE WITH MOBILE COMPUTING DEVICE FOR RENDERING VIRTUAL REALITY CONTENT

CLAIM OF PRIORITY

This is a continuation application of U.S. patent application Ser. No. 14/712,886, entitled "Head Mounted Device (HMD) System having Interface with Mobile Computing Device for Rendering Virtual Reality Content," which was filed on May 14, 2015, and which claims priority from U.S. Provisional Patent Application No. 62/006,022, filed on May 30, 2014, and which are herein incorporated by reference.

BACKGROUND

Field of the Invention

The present invention relates to headsets used for viewing media content and more particularly, headsets that can integrate smart devices and process image data for 3D rendering.

Description of the Related Art

The computing industry and the video game industry have seen many changes over the years. As computing power has expanded, developers of video games have created game software that have adapted to the increased computing power. To this end, video game developers have been coding games that incorporate sophisticated operations and mathematics to produce a very realistic game experience.

These games are presented as part of a gaming system including game consoles, portable game devices, and/or provided as services over a server or the cloud. As is well known, the game console is designed to connect to a monitor (usually a television) and enable user interaction through handheld controllers/input devices. A game console may include specialized processing hardware, including a CPU, a graphics processor for processing intensive graphics operations, a vector unit for performing geometric transformations, and other glue hardware, firmware, and software. The game console may be further designed with an optical disc tray for receiving game compact discs for local play through the game console. Online and multi-player gaming is also possible, where a user can interactively play against or with other users over the Internet. As game complexity continues to intrigue players, game and hardware manufacturers have continued to innovate to enable additional and more realistic interactivity.

A growing trend in the computer gaming industry is to develop games that increase the interaction between the user and the gaming system. One way of accomplishing a richer interactive experience is to use wireless game controllers whose movement and gestures are tracked by the gaming system. These movements and gestures are used as inputs for the game. Gesture inputs, generally speaking, refer to having an electronic device such as a computing system, video game console, smart appliance, etc., react to some gesture made by the user while playing the game that are captured by the electronic device.

Another way of accomplishing a more immersive interactive experience is to use a head-mounted display (HMD). A head-mounted display is worn by the user and can be configured to present various graphics, such as a view of a virtual space, in a display portion of the HMD. The graphics presented on a head-mounted display can cover a large portion or even all of a user's field of view. Hence, a head-mounted display can provide an immersive experience to the user. As connectivity to the internet continues to increase, more configurations of HMD systems have been introduced, and each with some advantages and associated limitations.

It is in this context that embodiments of the invention arise.

SUMMARY

Embodiments are described regarding systems, methods and apparatus that enable rendering of content to a display screen, and in particular on a head mounted display (HMD). The content rendered may include rich three dimensional content, which may be rendered in the context of immersive virtual reality content.

In one embodiment, a system is provided that includes a housing to be attached to a head of a user using a strap that connects to the housing. Display optics are integrated in the housing and are oriented on an internal side of the housing that is configured for orientation toward eyes of the user when the housing is attached to the head of the user. Further, electronics are integrated with the housing and a holder is integrated in the housing. The holder is configured to retain a smartphone. When the smartphone is retained by the holder a screen of the smartphone is oriented toward the display optics of the housing. A connector is integrated in the housing to enable connection of the smartphone to the electronics when the smartphone is retained by the holder. The smartphone includes a camera facing away from the display optics. The screen of the smartphone is configured to render images of a virtual reality (VR) space that is viewable through the display optics, and a program executed by the smartphone is configured to enable the camera to provide a pass-through view of a real world environment. The pass-through view provides images of the real world environment instead of the VR space.

In another embodiment, a device is provided that includes a slot or holder for receiving a smartphone. The device is configured with straps or head-attach structure so that a smartphone can be located in the slot or holder. The screen of the smartphone, in one configuration, is viewable to the user much in the same way a traditional HMD has a screen integrated therein. The device, therefore, does not include the display screen, but instead the display screen of the smartphone is used to render images to be viewed by the user. In one implementation, the smartphone will communicate with the Internet to access content or access content from storage of the smartphone. In a connected mode, the smartphone may obtain a streaming content or downloaded content, which can be rendered on the smartphone when the smartphone is operating as a head mounted device. In one embodiment, the content rendered on the display of the phone is distorted to produce three dimensional images, and the optics of the smartphone holding device can un-distort the images so that the content displayed by the smartphone, when viewed via the optics of the device, will appear to be rich three dimensional image/video/interactive data. In one configuration, the head mounted device will include shutter control logic that will allow control of the right and left eye optics of the device, such that the image data is rapidly shuttered to show left, right, left, right, left, right . . . and so on, images, which in essence enable the image data rendered by the head mounted display (i.e., holding device and smartphone) to be three-dimensional, rich and immersive.

A head mounted display (HMD) system is provided. The system includes a housing and optics disposed in the housing. The system further includes a processor disposed in the housing and shutter control logic interfaced with the processor. The shutter control logic is configured to operate to alternate between opening a left eye-side of the optics and closing a right eye-side of the optics to opening the right eye-side of the optics and closing the left eye-side of the optics. A holder portion is integrated with the housing. The holder portion is configured to receive a smart device having a display screen. The display screen is oriented toward the optics of the housing in a direction that is toward a face of a user when the HMD system is worn by the user. The shutter control in operation is configured to enable a three-dimensional view of image date rendered on the display screen of the smart device when viewed through the optics of the housing.

In another embodiment, a system for rendering virtual reality content is provided. The system includes a housing to be attached to a head of a user via a strap. The system further includes optics integrated in the housing. The display optics are oriented on an internal side of the housing that is configured for orientation toward eyes of the user when the housing is attached to the head of the user. A holder is integrated in the housing. The holder is configured to receive a smartphone or smart device (i.e., tablet or device with a screen). In one example, a screen of the smartphone is oriented toward the display optics of the housing. The smartphone has a data connection with the holder to enable data communication between electronics of the housing and electronics of the smartphone. Shutter control logic is interfaced with the electronics of the housing. Optics control logic is interfaced with the optics. A processor is configured to interface with the shutter control logic and the optics control logic. The processor is configured to set the shutter control logic to successively switch between rendering image data obtained from the screen of the smartphone to only a left eye-side of the optics and then only to a right eye-side of the optics. The processor is further configured to interface with the optics control logic so that rendering is optimized for when the image data is provided to the left and right eye-sides of the optics. The shutter control logic enables display of three-dimensional images, as perceived by a user, from the image data rendered on the screen of the smartphone when viewed through the optics of the housing.

In some implementation, the system includes a device interface (wired or wireless) for connecting the smartphone to the housing.

In some implementation, the system includes an inertial sensor of the housing. The inertial sensor provides movement and orientation data of the housing, and the movement and orientation data of the housing is communicated to the smartphone. The smartphone uses the movement and orientation data of the housing along with movement and orientation produced by an inertial sensor of the smartphone to fine-tune movement and orientation of the housing to influence or update a view direction and perspective into a virtual reality scene rendered by the smartphone.

In some implementation, the system includes combining at least some data from the inertial sensor of the housing with data from the inertial sensor of the smartphone to improve tracking of the housing.

In some implementation, the system includes a plurality of light emitting diodes disposed on a surface of the housing, the light emitting diodes used for tracking position of the housing using at least one camera.

In some implementation, the system includes a plurality of photo diodes disposed on a surface of the housing, the photo diodes used for tracking position of the housing using at least one light emitting device positioned in space where the housing is to be tracked.

In some implementation, the system includes circuitry of the electronics of the housing for processing a see-through mode, wherein a front facing camera of the smartphone is activated. The shutter control logic is paused and the optics control logic enables display of image data from the screen of the smartphone that shows a real-world view via the front facing camera of the smartphone, when in the see-through mode.

In some implementation, the system includes circuitry of the electronics of the housing for processing a see-through mode, wherein a front facing camera of the housing is activated. The shutter control logic is paused and the optics control logic enables display of image data from the screen of the smartphone that shows a real-world view via the front facing camera of the housing, when in the see-through mode.

In some implementation, the system includes a network interface integrated with the housing. The network interface providing access to the network for connecting to an internet site having digital content. The digital content is one of streaming content or interactive streaming content, and wherein the streaming interactive content is to be rendered by the smartphone for display via the optics of the housing.

In some implementation, the system includes a network interface provided by the smartphone. The network interface provides access to the network for connecting to an internet site having digital content. The digital content is one of streaming content or interactive streaming content, wherein the streaming interactive content is to be rendered by the smartphone for display via the optics of the housing.

In some embodiments, the optics that are integrated into the housing include a left eye optic and a right eye optic.

In some embodiments, the housing includes a device input (i.e., interface for communication with input devices or information. The device input is configured for receiving user input for controlling at least part of an interactive content scene rendered in the image data generated by the smartphone.

In one embodiment, the user input is via a controller, a hand gesture, a touch gesture, or voice control, or a combination thereof.

DETAILED DESCRIPTION

Embodiments are described regarding systems, methods and apparatus that enable rendering of content to a display screen. The content rendered may include rich three dimensional content, which may be rendered in the context of immersive virtual reality content. The content may be game related, entertainment related, communication related, social communication or sharing related, or combinations of these and other types of media and information. In some examples described with reference to FIGS. 1A-7, head set devices are shown that may be configured to communication with a second computing device. In one example, the second computing device can be a smartphone, tablet, computer, watch, or some device that can communicate to obtain image content and enable rendering of such image content.

In one implementation, a head mounted device is provided, which includes a slot or holder for receiving a smartphone, so as to allow the screen of the smartphone to be the display of the head mounted device. Thus, in this example, the head mounted device does not include the display screen, but instead will use the display screen of the smartphone, when inserted or placed in a holder of the head mounted device. The smartphone may be connected to the head mounted device via wired or wireless connection. In such an implementation, the smartphone will communicate with the Internet to access content, such as streaming content or downloaded content, which can be rendered on the smartphone when the smartphone is inserted or coupled to the head mounted device. In a basic form, the head mounted device will include electronics for communicating with the smartphone, either wired or wireless. The head mounted device may include optics for enabling viewing of the content rendered on the display.

In one embodiment, the content rendered on the display of the phone is distorted to produce three dimensional images, and the optics of the head mounted display can un-distort the images so that the content displayed by the smartphone, when viewed via the optics of the head mounted device, will appear to be rich three dimensional image/video/interactive data. In another embodiment, the content rendered on the display of the smartphone, when inserted into the head mounted device, will render images that can be processed by the head mounted device to appear as three-dimensional. In one embodiment, the head mounted device will include shutter control logic that will allow control of the right and left eye optics of the head mounted device, such that the image data is rapidly shuttered to show left, right, left, right, left, right . . . and so on, images, which in essence enable the image data rendered by the head mounted display to be three-dimensional, rich and immersive.

Figure 1A:
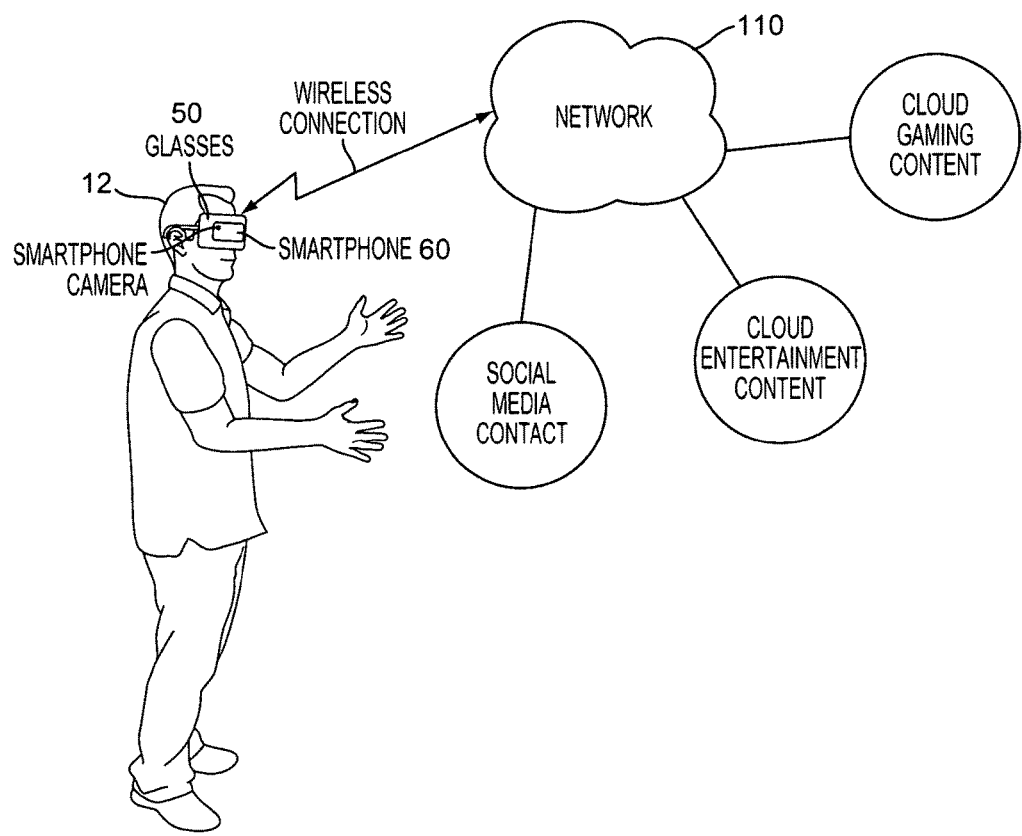
FIG. 1A illustrates a user wearing a device, e.g., housing that can receive a smartphone or smart device, the device is in a form of glasses or a head mounted device (HMD), in accordance with one embodiment.

FIG. 1A illustrates an example of a user wearing a head mounted device, which may include a smartphone 60 held, inserted, clipped, slid into, associated to, or paired to the head mounted device. The glasses 50 may in one embodiment define the HMD, when the smartphone 60 is inserted therein. The head mounted device can be a simple shell device that holds the smartphone 60 in place, and provides optics for viewing through to the screen of the smartphone 60. In another embodiment, the head mounted device can be more intelligent, which can include electronics for communicating with the smartphone 60 when connected, in proximity, or associated to the head mounted device. In this illustration, the head mounted device is shown as glasses 50, which have a smartphone connected or clipped to the glasses.

The smartphone can use its native wireless communication circuitry to communicate with the network 110, such as the Internet. The smartphone 60 can communicate to various content sites including cloud gaming content, cloud entertainment content, social media content, or any other type of content that is accessible over the Internet or private networks. In one embodiment, the content being accessed by the smartphone 60 can be downloaded and executed by the smartphone once the content has been received. In another embodiment, the content can be streamed from the Internet source, and delivered to the smartphone 60 when needed. In one embodiment, the content is streamed from a service provider that provides games, content, entertainment content, or other multimedia for consumption by the smartphone when used with a head mounted device or glasses 50.

Figure 1B:
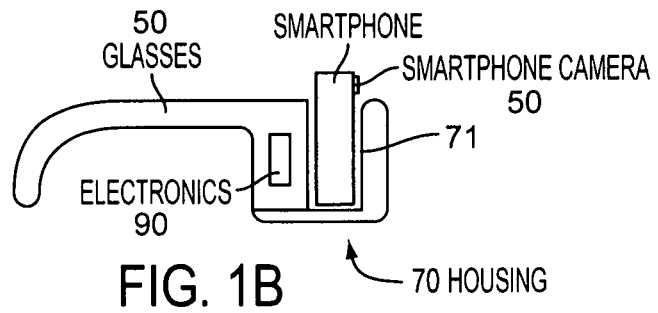
FIG. 1B illustrates a side view of the glasses, which include electronics and a holder for a smartphone, in accordance with one embodiment.

FIG. 1B illustrates a side view of a pair of glasses 50 that include electronics for interfacing with a smartphone 60 when the smartphone 60 has been inserted or held by the glasses 50. In this example, the smartphone 60 sits vertically in a slot or holder of the glasses 50, such that the smartphone 60 camera faces forward to allow a see-through or pass-through view of the environment when the glasses 50 are worn by a user. The body of the glasses 50 defines the housing 70. The housing 70 can hold electronics 90 and can include a holder 91. The holder, as described herein, shall include any structure for holding, clipping, clamping, securing, attaching, or otherwise maintaining the smartphone in place. In one embodiment, activation of the see-through mode (i.e., transparent or semi-transparent mode) is used when the user is interacting with a virtual scene displayed by the smartphone 60 device through the glasses 50, and the user wishes to disconnect from the virtual scene to interact with another person, take a phone call, pause game, pause session, or an interactive session or communication. The see-through mode can also be automatically triggered, such as when signals are received or when safety alerts or notifications are needed.

Figure 1C:
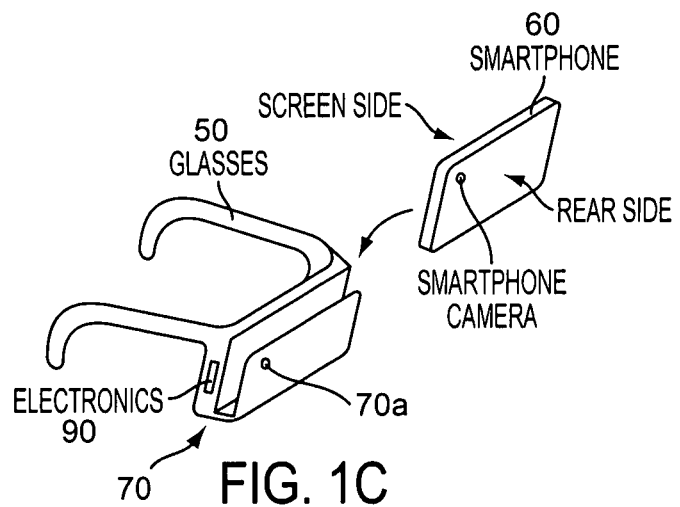
FIG. 1C illustrates a perspective view of the glasses with a slot for holding the smartphone, in accordance with one embodiment.

FIG. 1C illustrates an example of the glasses, which include electronics 90 for communicating with a plug, Bluetooth, Wi-Fi, and other wireless protocol, or wired connection, plug, connector, of the glasses 50 and the smartphone 60 when connected together. In this example, the smartphone screen 60a side will face the location of the user's eyes or generally toward the eyes when the glasses 50 are worn or inserted over the face of the user. The rear side of the smartphone can include a smartphone camera which can face forward. In one embodiment, the glasses 50 can include a slot or hole 70a so that the camera of the rear side of the smartphone can see through the casing of the glasses 50. In another embodiment, the casing of the glasses 50 can include a see-through or clear panel to allow the smartphone 60 camera to see through the panel.

Figure 1D:
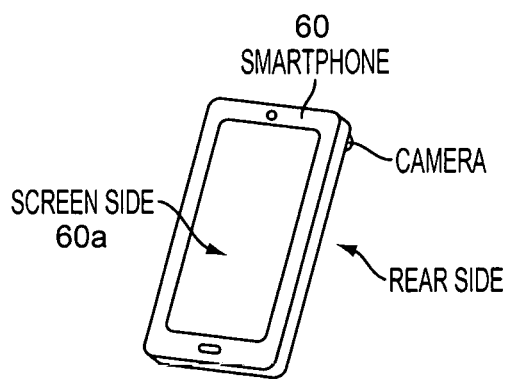
FIG. 1D illustrates an example smartphone, which can also include a smart device, a tablet device or any device having a screen for displaying content, in accordance with one embodiment.

FIG. 1D illustrates an example of a smartphone 60, which can include a camera located on the rear side and also on the front side. The screen side 60a of the smartphone will face forward toward the users eyes when inserted into the glasses 50. As will be described below, the glasses 50, in one embodiment, may include optics 80 that will reside between the user's eyes and the screen 60a of the smartphone 60. The optics 80 can be tailored to provide viewing of the content provided by the smartphone screen 60a and optimize the rendering, sizing, re-sizing, sharpness, prescription, and other distortion or non-distortion adjustments.

Figure 2:
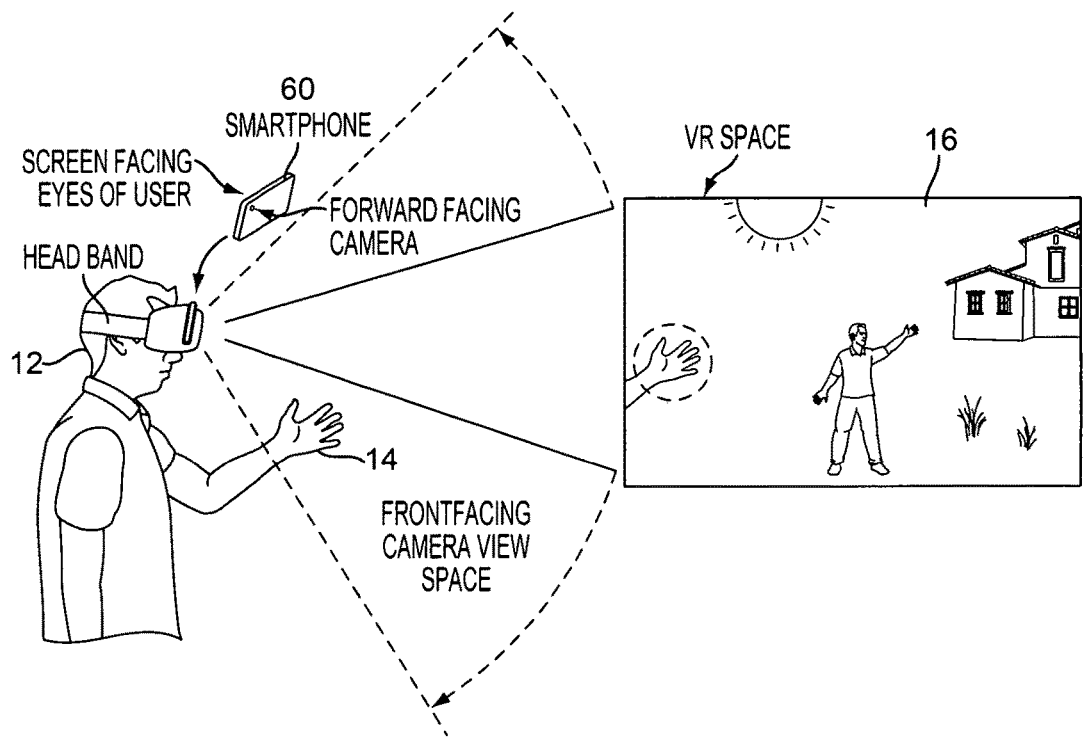
FIG. 2 illustrates a user wearing the HMD device, which includes the smartphone and interaction with a scene rendered by the HMD device, in accordance with one embodiment.

FIG. 2 illustrates an example of a user wearing the head mounted device (glasses) 50 which has received or is about to receive the smartphone 60. The smartphone 60, in one embodiment, is connected to the electronics 90 of the head mounted device 50 so that the optics 80 can be synchronized with logic, software, firmware of the smartphone 60 for rendering of the images of the smartphone screen 60a through the optics 80 to the user. In one embodiment, the content being rendered by the smartphone 60 will be virtual reality three-dimensional content, which is delivered to the smartphone 60 in the form of an application that is downloaded or in a streaming format from a website, service, service provider, content provider, entertainment provider, or the like. In one embodiment, the content rendered on the smartphone 60 is virtual reality rendering content which is shown in an example screen defined as the VR space.

The front facing camera of the smartphone 60 may be monitoring this front view of the glasses 50 to assist the user in interacting with the scene, such as allowing the user 12 to place a hand 14 into the scene 16 to interact with the content in the VR space. Thus, the user in the real world space can place his hand into a view space of the front facing camera, and this is detected by software operating on the smartphone to allow blending of the user's hand 14 into the VR space. The users hand can be rendered into the VR space as the user's actual hand or as augmented reality, or as a blend of augmented and real world images.

Figure 3A:
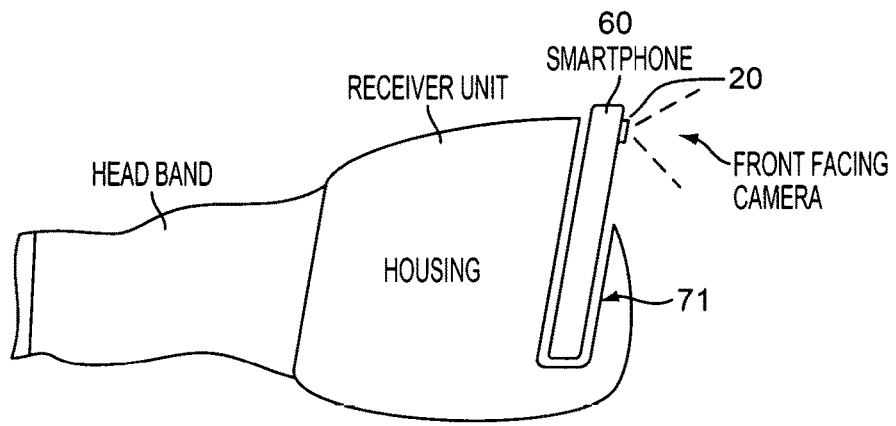
FIG. 3A illustrates an example form-factor of the housing, e.g., receiver unit that can hold a smartphone, wherein the camera of the smartphone is front facing.

FIG. 3A illustrates an example of the glasses 50, which are shown as a housing that includes a clip or shelf 71 for receiving the smartphone 60. It should be understood that the shape and ergonomics of the housing can change depending on specific implementations. Thus, the example implementations provided herein are just that, examples, which may be modified so long as they function and provide the interactivity between the devices, in accordance with the various embodiments.

In this particular example, the housing includes a clip 71 (or holder) that allows the front facing camera to freely view the front space or area in the real world of the user. In one embodiment, as mentioned above, the content may switch from a transparent mode to view outside of the virtual reality space, and back to the real world space. Thus, the front facing camera 20 provides a real-world view when the user desires to view the real world and exit the VR space. In another embodiment, the front facing camera 20 can provide safety notifications to the user while the user is interacting in a VR space. For example, if the user walks around a particular space and is dangerously approaching stairs, a wall, or some other object, a notification can be provided to the user in the head mounted display as a message, notification, alarm, sound, tactile feedback, or the like.

The camera 20 is therefore useful for providing safety notifications of the real world space when the user becomes immersed in the virtual reality space. The user can also be provided with transitions out of the virtual reality space into the real world space in partially transparent views, fully transparent views, blends of fully and partially transparent views, or partial views that may show actual features that are of interest to the user or may be dangerous when the user is wearing the head mounted device that is enabled by a smartphone 60.

Figure 3B:
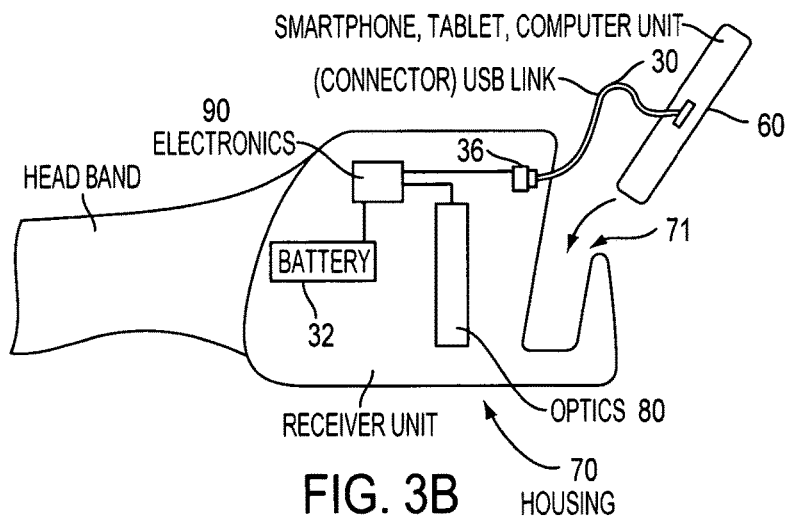
FIG. 3B illustrates an example configuration wherein the smartphone is connected by a wire to the housing receiving unit, and optics of the receiving unit/housing, in accordance with one embodiment.

FIG. 3B illustrates an example of the head mounted device, which includes a headband, and the housing 70. The housing 70 is shown to include electronics 90 and optics 80, which sit between the location of where the eyes of the user will reside and the front face of the screen of the smartphone 60, when placed in a slot, holder, clip, or connection 71. A battery may also be provided with the housing to power the electronics 90.

In another embodiment, a connector plug or wire 30 can be used to provide power via a battery 32 disposed in the housing 70. In another embodiment, a battery of the smartphone 60 can operate electronics 90 of the head mounted device 50. As mentioned above, the smartphone 60 can also be a tablet, a computer unit, a partial computer unit, or any hybrid device with a display screen. In this example, the smartphone 60 is connected to the receiver unit by way of a USB link connector 36. The smartphone 60 is therefore connected to the electronics 90 of the receiver unit for handling information received from the smartphone 60, such as synchronization of image data with the operation of the optics 80.

Figure 4A:
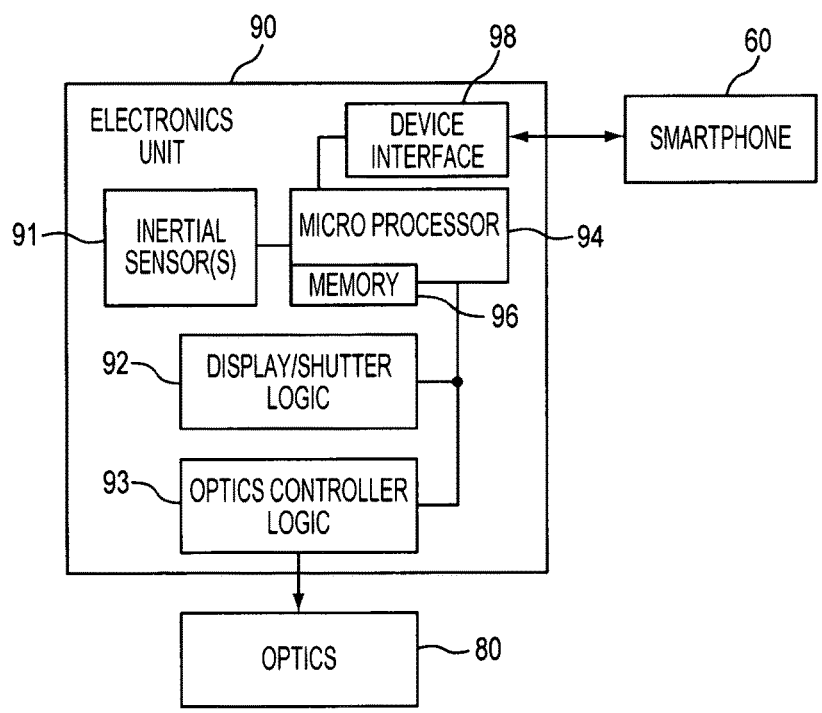
FIG. 4A illustrates example electronics that are part of the receiver unit or housing, and the interface of the electronics with the optics and the smartphone, in accordance with one embodiment.

FIG. 4A illustrates an example of an electronics unit 90, which may be used in a head mounted device 50. In one example, the electronics unit 90 can include a device interface 98 for connecting to a smartphone 60. The device interface 98 can be in communication with a microprocessor 94 and memory 96. The microprocessor 94 can be coupled to the inertial sensors 91 that are part of the electronics unit 90 or receiver unit. The inertial sensors 91 may include accelerometers, gyroscopes, magnetometers, and combinations of one or more of the same or combinations of those devices. In general, the inertial sensors 91 provide data from movement and positioning of the housing 70 when worn by the user.

These motions and movements can be translated into information regarding position that can be used for tracked and can be used to show or change the images (i.e., image content) provided by the smartphone 60, in respect to the virtual reality content being rendered or interfaced with. For instance, as the user 12 moves his head around, different images and scenes can be provided by the display 60a of the smartphone 60 based on the content that is associated with those locations that the user is looking at toward or away from. The microprocessor unit 94 can also be in communication with a display shutter logic 92. Display shutter logic 92 can be coupled to optics controller logic 93 that then couples to the optics 80 of the receiver unit (i.e., housing). In one embodiment, content can be provided to the smartphone 60 from a remote server in a formatted three-dimensional form or in a normal un-formatted form. For example, each frame can include a left and a right eye image, which is essentially the same image provided to both the left and the right eye and provided in a distorted format. In one embodiment, this stream of frames can be downloaded in a streaming format from a service to the smartphone for display on the receiver unit via optics 80.

The display shutter logic 92 can configure the system to show the images to the respective eyes for received frames, in a sequential left, right, left, right, left, right, etc. In this manner, the left eye will see the content from the left part of the frame for a received frame, and then the right eye will see the content from the right part of the frame for the next received frame, and then the left eye will see the left part of a received frame, and then the right eye will see the content from the right part of the frame for the next frame, and so on. This is illustrated in more detail with reference to FIG. 4C.

Figure 4B:
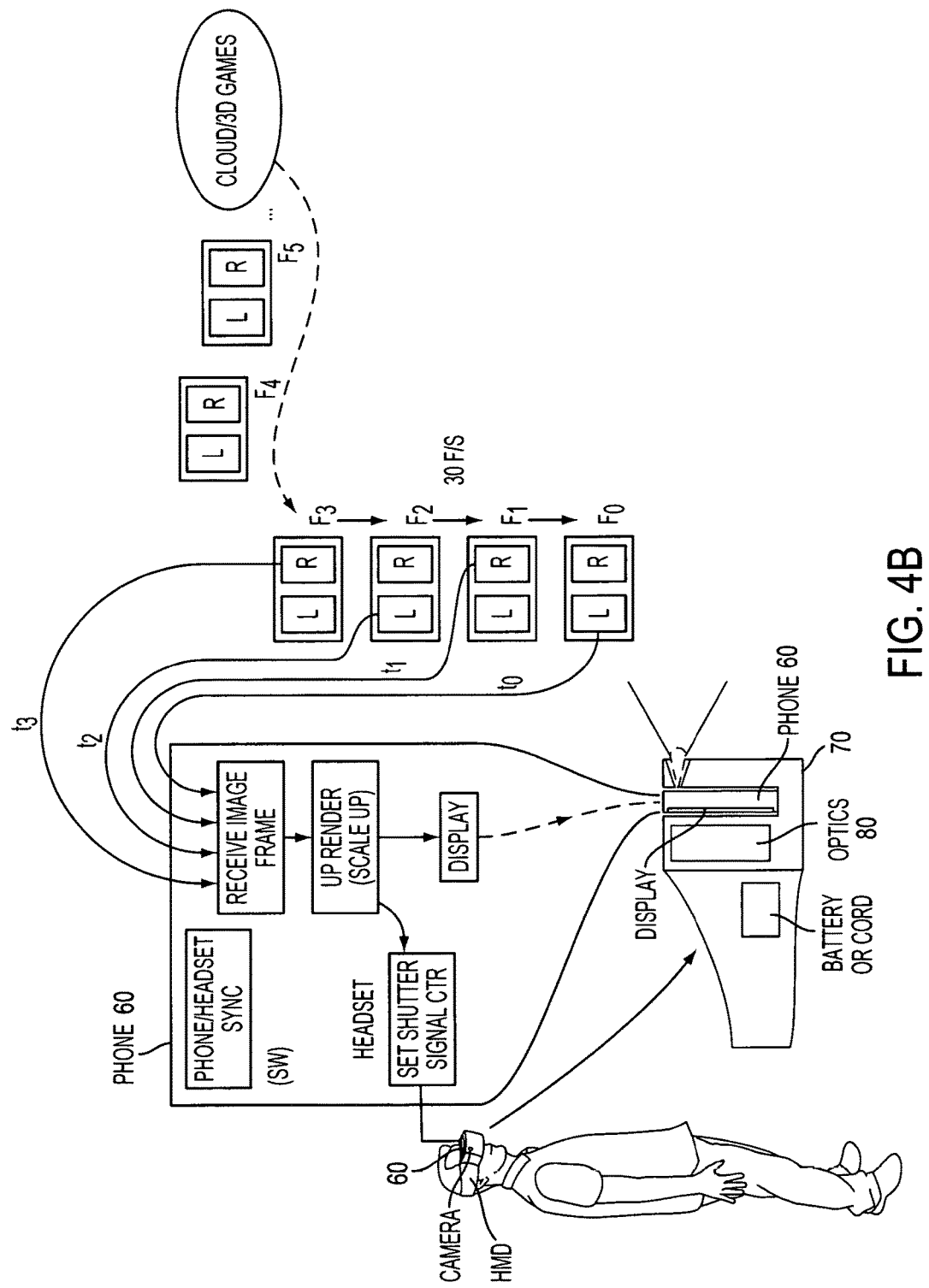
FIG. 4B illustrates an example where software of the smartphone is configured to process the frame selection and left/right eye selection, including up-rendering (scale-up), and processing for display and viewing through the optics of the HMD housing, in accordance with one embodiment.

FIG. 4B illustrates an example of a user 12 wearing a head mounted device with a smartphone 60 inserted therein. In this example, the smartphone processing will receive a stream of frames from a cloud processing system which may be delivering three-dimensional games to the portable devices. In this illustration, each frame being delivered to the smartphone will each include left and right eye image content. A software module executed on the smartphone 60 or on electronics 90 of the head mounted device, or on both the electronics 90 of the head mounted device and the smartphone 60 will execute the receiving of the frames (e.g., a stream of frames from the cloud processing system). The stream of frames can be delivered, for example at 30 frames per second. Other frame rates are possible, depending on the implementation.

As shown, the received image frame module will receive the images, and an up render (scale-up) module will scale up a selected left or right part of an image frame. The selected left or right image frame, being scaled up, will be and provided to the display of the smartphone 60 for display on the entire screen of the smartphone device 60, instead of having the smartphone device show both the left and right eyes in a smaller less immersive format. Further, the software can include logic so that the head mounted device can select to shutter the left or right eye sequentially, so that the left or right eye, in continual sequence, will see the entire screen rendered by the smartphone. In one example, frames 0, 1, 2, 3, 4, and 5 are shown. These frames are being streamed from the cloud system and each frame will include a left and right eye image content. In accordance with one embodiment, for frame 0, the software will select the left eye image content from the frame, and will render up that left eye content for display on the portable device.

In synchronization, the software will provide instructions to a shutter system of the glasses which will open the shutter for the left eye so that the user views the entire screen for the left eye at the time when the scaled up image is provided to the entire display screen of the phone. The same process will happen with frame 1, except that the right eye content is scaled up, shown on the display screen, and the shutter will show the content to the right eye of the user. This process will continue sequentially so as to provide a three-dimensional effect to the content being displayed by the smartphone. In one embodiment, the software the smartphone is essentially providing for a frame select, and up render, and shutter select instructions to the glasses.

In an alternate embodiment, the image data received from the source will provide full images, which avoids the need to up-render. In this case, the shutter logic will simply show the content to the left and right eyes, switching successively, to provide a three-dimensional effect. As such, the 3D effect can be processed with or without pre-formatting of the image content that is delivered or displayed by the smartphone 60 via the optics 80. In this embodiment, therefore, the shutter logic simply synchronizes with the frame rate of images rendered by the screen of the smartphone, and the left/right shuttering provides for the necessary three-dimensional effect. In some embodiments, the image data (e.g., interactive video) is sent for use with the shutter system and in others, the image data is simply sent and the shuttering is done by the electronics 90 of the housing 70.

Figure 4C:
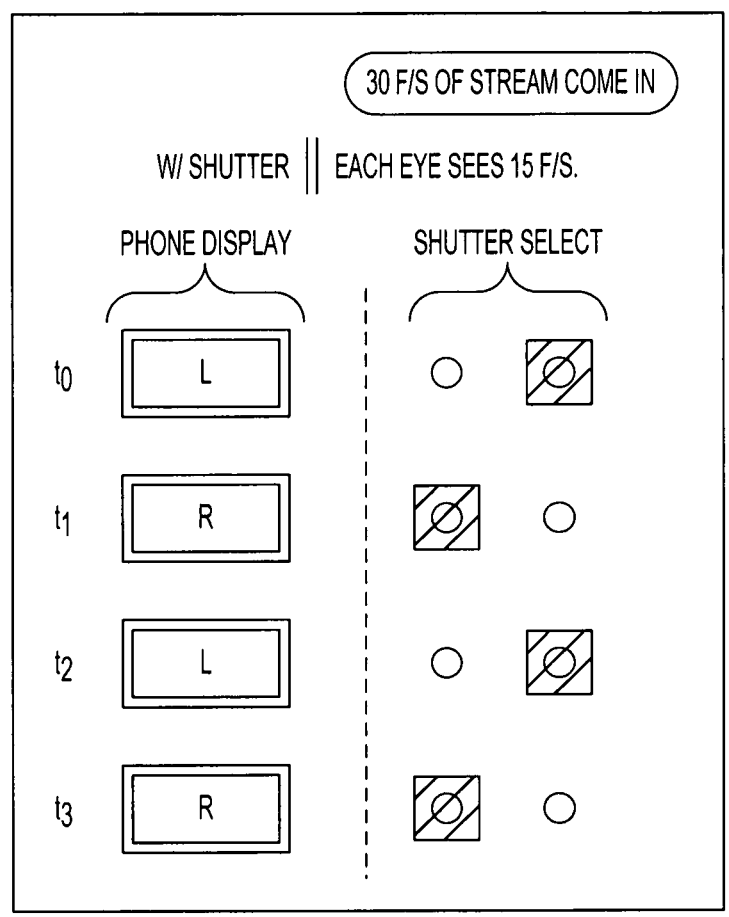
FIG. 4C illustrates an example wherein the shutter logic sets the optics to alternating left/right viewing, in accordance with one embodiment.

FIG. 4C illustrates an example of the stream arriving at 30 frames per second arriving from a streaming service. In this example, with the shutter system of the glasses, each eye sees 15 frames per second. At time 0, the phone will display the left eye image content that has been scaled up and the shutter will open the left eye for viewing of the content. At time 1, the software will select the right eye content from the frame scaled up and the shutter will allow the right eye to view the entire screen of the phone display. This process will continue for time 2, time 3 and so on. In other embodiments, the frame rate can be increased for the stream of images coming into the smartphone 60, depending on bandwidth. In one embodiment, if the frame rate of the stream frames is 60 frames per second, each eye will see 30 frames per second. In essence, the content can be made to be rich three-dimensional content by simply using a shutter system that will select parts of an image of the frame and then display a scaled up version to the display screen. As noted above, scale-up is optional, and the system can operate on full received image frames and shuttering and display via the optics 80. The frame rate, in some embodiments can also be 120, 240, or more frames per second, depending on the bandwidth and processing power.

In still another example, with reference to FIGS. 4B and 4C, a three-dimensional video stream is transmitted to a head mounted display (i.e., the screen 60a of a smartphone 60). Each frame of the three-dimensional video stream includes both a left eye image and a right eye image. A given frame is processed to extract either the left eye image or the right eye image, but not both. For a given frame, the extracted image (left eye or right eye) is up-rendered to fit the display size of the head mounted display, and the shutter of the head mounted display is set to allow display of the portion of the given frame (either left eye or right eye) that is currently extracted and up-rendered. Then, the extracted and up-rendered portion of the given frame is displayed.

For sequential frames, the extraction, up-rendering, shutter setting, and displaying operations alternate between the left eye image and the right eye image, such that for a given frame only the left eye image portion or the right eye image portion is processed, with the next frame having the other of the left eye image portion or right eye image portion processed, and so on. With a normal frame rate, the processing of only the left eye image portion or right eye image portion of a given frame in an alternating manner is not discernable to the human optic system, and provides for improved efficiency in processing the three-dimensional video stream. Again, the video stream can also provide non-3D image data, which is the given 3D effect by the shuttering. Also, in some embodiments, the image data need not be up-rendered, and the full size images can be shuttered.

Figure 5:
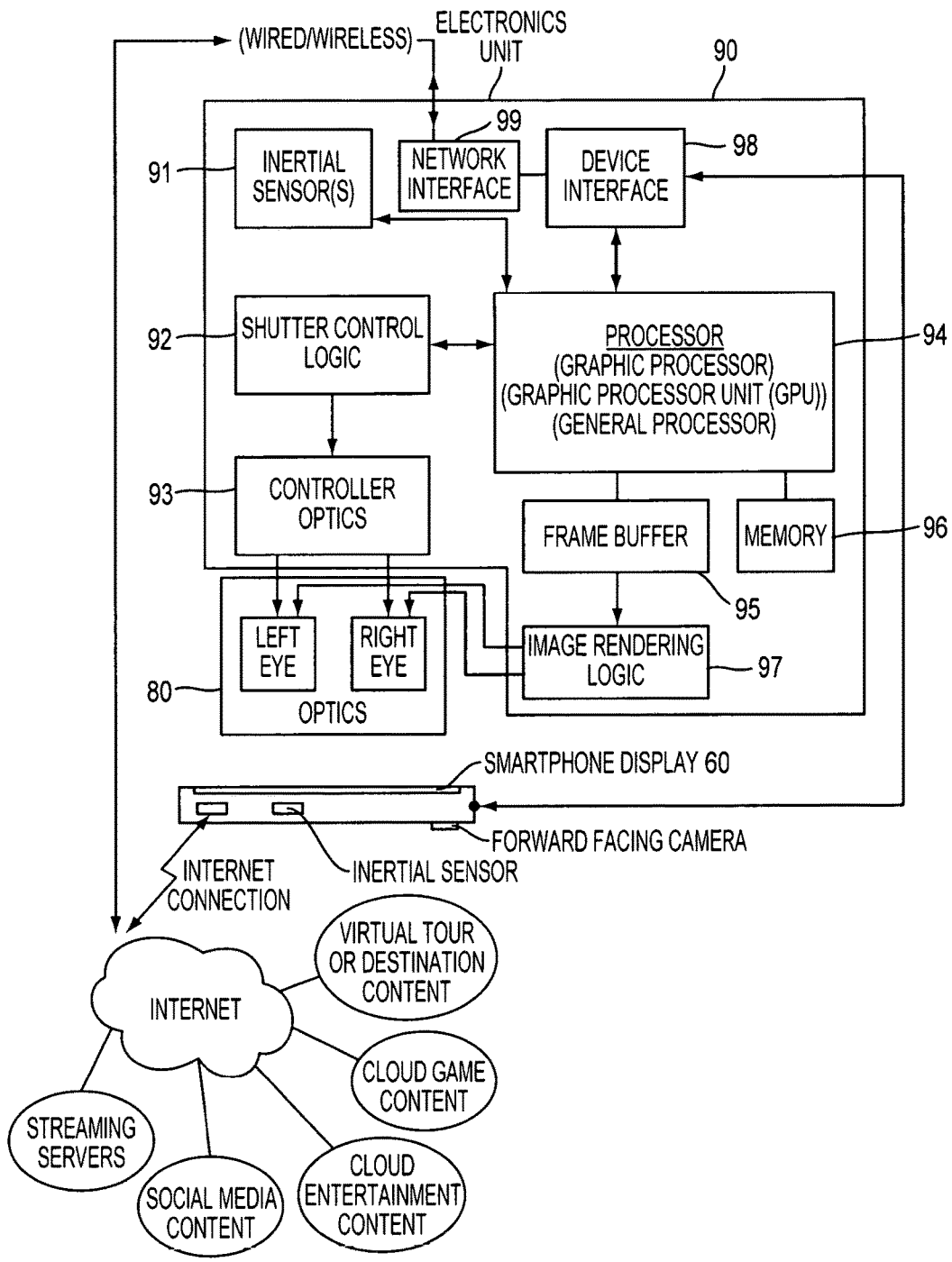
FIG. 5 illustrates an example of electrics of a housing, which can include the shutter control logic, the controller optics, a processor, network interface, inertial sensor(s), memory, frame buffers, and device interfaces for connecting with the smartphone, and internet access to digital content, in accordance with one embodiment.

FIG. 5 illustrates an example of an electronics unit 90, which may include other functionality, circuitry, firmware, logic, processors, memory, etc. These features are only exemplary and some systems may include more or fewer devices depending on the implementation. In the one example provided in FIG. 5, the electronics unit 90 may be part of the glasses 50. The electronics unit 90 will include a processor 94 which can include a graphics processor or a GPU, or general processor. In some embodiments, multiple processors may be provided, or multicore processors. The processors 94 can be in communication with inertial sensors 91 that may be part of the glasses or head mounted device. The inertial sensors 91 can collect information for motion, movement, dead reckoning, and tracking. This information can be shared with the processor 94.

In another embodiment, a plurality of photo diodes are disposed on a surface of the housing. The photo diodes are used for tracking position of the housing using at least one light emitting device positioned in space/room where the housing is to be tracked. For example, the photo diodes can be disposed on the surface of the housing, e.g., with known physical separations to one another. The light emitter can, for example, shoot out light in various directions so that some of the light will contact/reach the photo diodes. A timing profile is calculated or calibrated, so that timing is known or synced with the detection and emitting. In this manner, it is possible to identify when certain of the photo diodes detect light, and because the location of the emitter (e.g., one or two rotating emitters paced in a room) and timing is known, it is possible to identify the position of the housing having the photo diodes. As the emitting and detecting is on-going during the use of the HMD system, tracking of the HMD/housing is facilitated.

The processor can also control the shutter control logic 92, which then can interface with controllable optics 93, which can control the left and right eye optics 80 of the glasses. In one embodiment, the processor can also be coupled to a frame buffer 95 and memory 96, or simply memory 96. The frame buffer 95 can also be in communication with an image rendering logic 97 that also provides image data to the left and right eye of the optics 80. For example, the head mounted device (glasses) 50 can also receive a separate feed of content or data from the Internet which can be blended with the content received by the smartphone 60 and displayed by the smartphones screen 60a. In one embodiment, the content displayed by the smartphone 60 can be augmented with additional content provided by the head mounted display 50. In one embodiment, the content obtained by the head mounted device (glasses) 50, can be blended, multiplex, or geared with content received by and displayed by the smartphone. For example, content can be switched between that received by the head mounted device and that received by the smartphone 60.

In other embodiments, depending on the content being displayed, overlays, communication information, second channel chat feeds, social network data, picture in a picture display data or other content can be provided to the left or right or both eyes through the optics of the glasses and can be blended or replaced or interlaced with data provided by the smartphone device 60. In one embodiment, the smartphone device 60 and the electronics unit 90 can include a network interface 99 and a device interface 98, which will allow communication with the Internet and provide access to various content sites. The content site can provide content to the devices for VR rendering, image production, communication, social network sharing, virtual reality tours, destination touring content, cloud gaming content, cloud entertainment content, social media content, streaming servers, nearby head mounted display players, and other information.

In one embodiment, an active shutter 3D system (e.g., alternate frame sequencing, alternate image, AI, alternating field, field sequential or eclipse method) may be used to display stereoscopic 3D images. In one configuration, a system works by only presenting the image intended for the left eye while blocking the right eye's view, then presenting the right-eye image while blocking the left eye, and repeating this so rapidly that the interruptions do not interfere with the perceived fusion of the two images into a single 3D image.

Some active shutter 3D systems use liquid crystal shutter glasses (also called "LC shutter glasses" or "active shutter glasses"). OLED screens are also usable. Each eye's glass contains a liquid crystal layer which has the property of becoming opaque when voltage is applied, being otherwise transparent. The glasses are controlled by a timing signal that allows the glasses to alternately block one eye, and then the other, in synchronization with the refresh rate of the screen. The timing synchronization to the video equipment may be achieved via a wired signal, or wirelessly by either an infrared or radio frequency (e.g., Bluetooth, DLP link) transmitter. Active shutter 3D systems can also be implemented to present 3D films in some theaters, and they can be used to present 3D images on CRT, plasma, LCD, 3D images on HMD systems, VR display systems, smartphones, game consoles, screens, displays, and combinations thereof.

Figure 6:
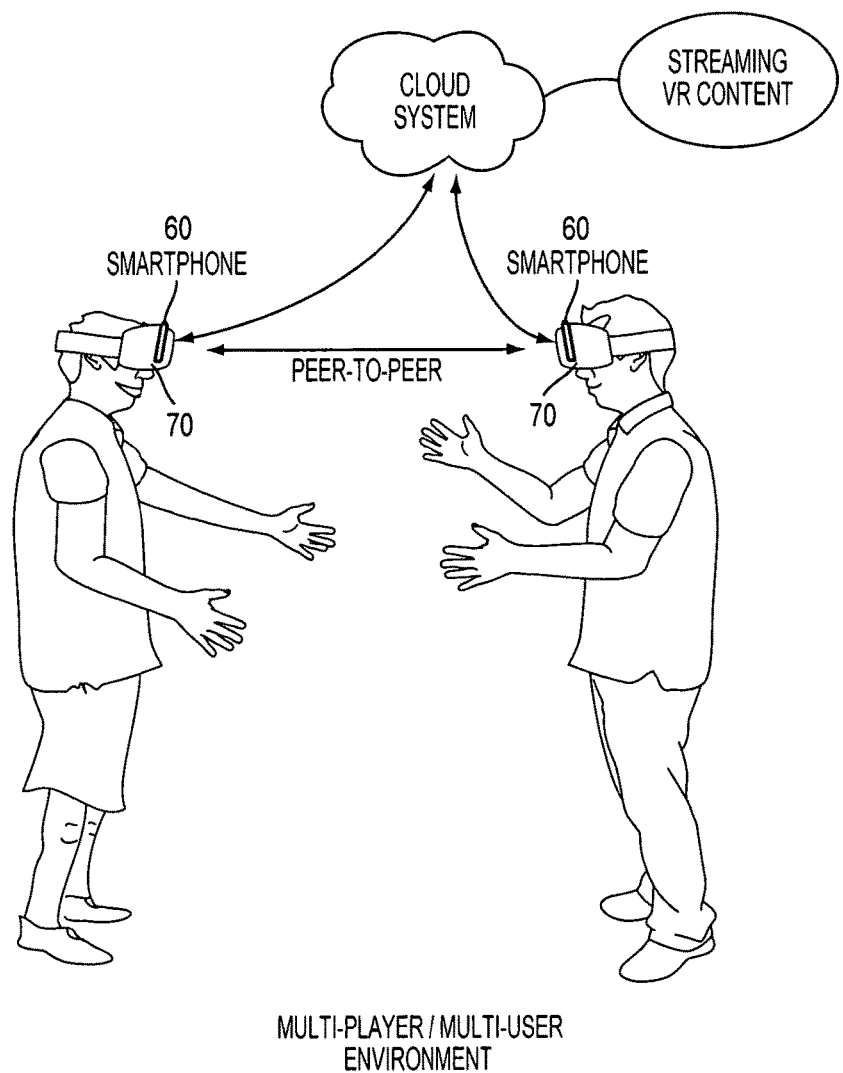
FIG. 6 illustrates an example where co-located users can share content locally, e.g., peer-to-peer, including with a cloud system, in accordance with one embodiment.

FIG. 6 illustrates an example of a multiplayer or multiuser environment, where multiple users may be using a head mounted device 50 with a smartphone 60. In one embodiment, the smartphones 60 can communicate with a cloud system, which can provide streaming VR content. In one embodiment, the users may become close in proximity to each other which may allow the systems and software associated with the smartphones and VR content mixing to switch modes of communication. For example, if a pair of users are sharing a virtual reality site or location or interaction zone, some or all of the content can be communicated between the users via a peer-to-peer network (i.e., in a paired mode), which is a mode change from peer to cloud network.

The switching can occur dynamically over time when the proximity of the user's is detected, or per user setting or request. Latency can also be reduced by enabling local peer-to-peer communication. Switch to peer-to-peer can be for select data, e.g., a data channel, while the interactive video is being streamed to both users. For instance, local communication such as messaging, chat, audio channels, and notifications can be transferred via peer-to-peer, while the interactive data is streamed from the server to each user. In some cases, some streaming data can be sent one user and this data is shared to the other use, e.g., when one user has a higher bandwidth connection than the other. Accordingly, these embodiments would allow users to share VR spaces and communicate data between each other in a mixed mode fashion, which can allow both communication to the cloud system and peer-to-peer communication, near field communication, Wi-Fi communication, Bluetooth communication, or any combinations of other connected wired or wireless links.

Figure 7:
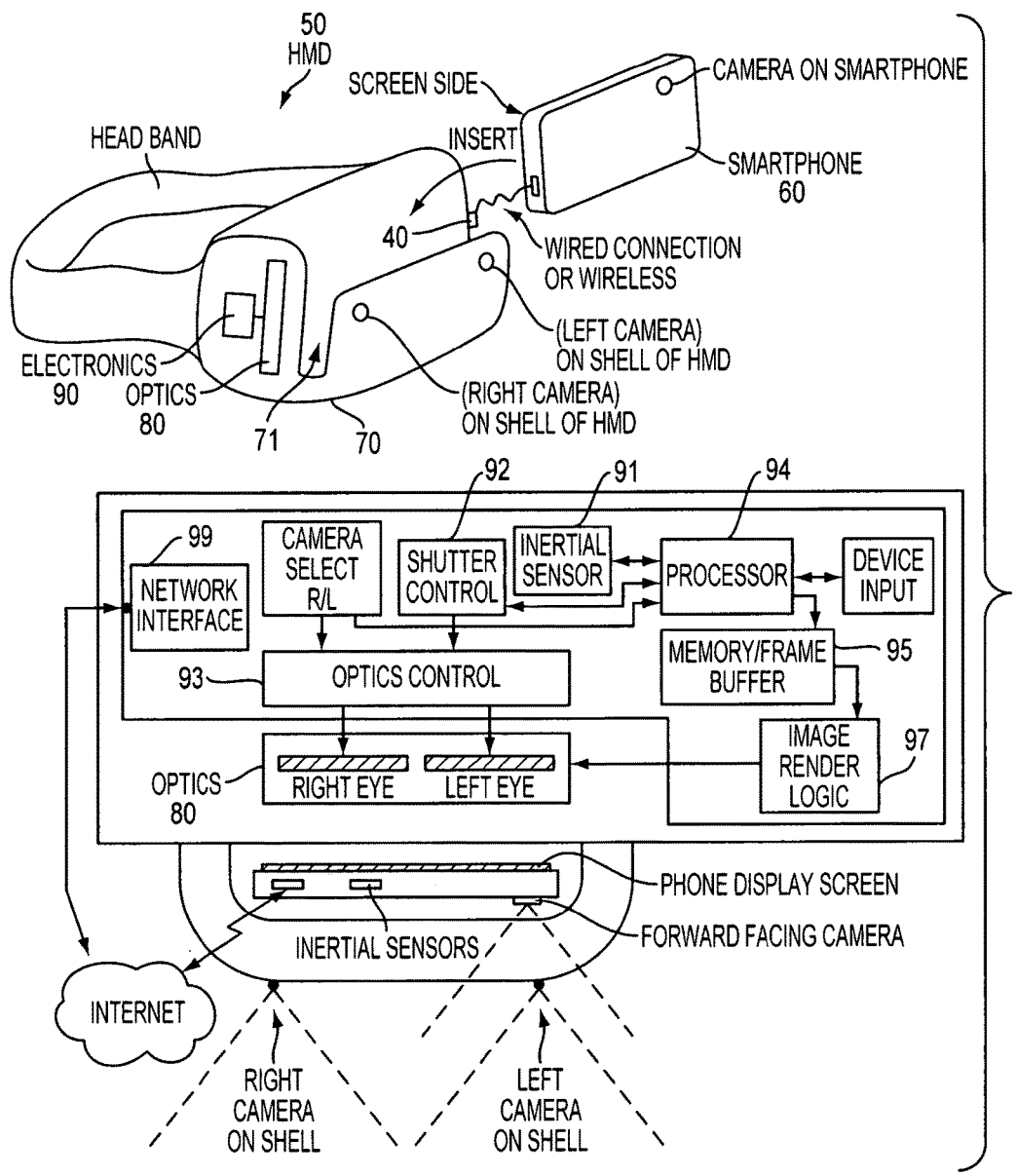
FIG. 7 illustrates another example of an HMD system, which uses a smartphone and shutter logic to provide rich 3D content, in a VR experience.

FIG. 7 illustrates another example of a head mounted device 50 which can include the slot 71 for receiving a smartphone 60. As discussed above, the smartphone 60 can be connected to the head mounted device or housing 70 by way of a connector 40. The connector 40 can be a wired connection or a wireless connection. Once the smartphone 60 is inserted into a holder 71 of the housing, the smartphone 60 can allow its front facing camera to face forward. In one embodiment, the housing is designed so that the camera of the smartphone can view forward without being blocked. The head mounted device 50 can also include electronics 90 and optics 80 as described above. In this embodiment, the head mounted device can also include two additional cameras, such as a left camera or a right camera on the housing of the HMD 50. These additional cameras can provide for three-dimensional viewing of content in front of the user when the user decides to flip between virtual reality scenes to real life and real world scenes in front of the user, e.g., in a pass through mode (or transport or semi-transport mode).

In this example, the electronics 90 of the head mounted device 50 can include a wireless network interface 99 or wired interface they can communicate with the Internet. The smartphone 60, shown inserted into the holder 71 of the housing and can also include its own Internet connection. The camera of the smartphone is front forward facing, but can include other cameras as well. Of course, the smartphone 60 can include its own inertial sensors (not shown). In addition, the head mounted device 50 can include inertial sensors 91 that are also in communication with a processor 94 of the head mounted device 50. The inertial sensors 91 of the head mounted device 50 can be in communication with the inertial sensors of the smartphone.

In one embodiment, blending, mixing, or dead reckoning can occur between data collected from the inertial sensors 91 of the head mounted device 50 and the smartphone 60, to avoid false positives, jerky movements, unexpected motions, or triggers that would be unnatural when viewing content in a VR scene. In this example, the processor 94 is in communication with shutter control 92 and camera select right-left which communicate with optics control 93 for the right and left eyes. Memory and/or a frame buffer 95 can also be provided so that the processor 94 can provide different data to the display screen than that provided by the display screen of the phone or a blended, multiplex, overlay, message overlay, social connection overlay, and the like can be provided by the head mounted device in addition to the content provided by this smartphone. In one embodiment, the processor can act to select the camera select right/left, so that the front facing left and right cameras of the head mounted device can be activated when the user wishes to see through the device and look at the real world.

Looking at the real world through two cameras can occur by way of a shutter control 92 that flips between left and right eye sequentially and continuously. This functionality will provide for the images associated with the real world to be more lifelike and include three-dimensional depth perspectives not provided by single camera front facing systems. In still another embodiment, the front facing cameras of the head mounted device 50 can assist for safety features, such as to inform users when the users are coming close to walls, objects, stairs, or unsafe zones.

In still another example, with reference to FIGS. 4B and 4C, a three-dimensional video stream is transmitted to a head mounted display. Each frame of the three-dimensional video stream includes both a left eye image and a right eye image. A given frame is processed to extract either the left eye image or the right eye image, but not both. For a given frame, the extracted image (left eye or right eye) is up-rendered to fit the display size of the head mounted display, and the shutter of the head mounted display is set to allow display of the portion of the given frame (either left eye or right eye) that is currently extracted and up-rendered. Then, the extracted and up-rendered portion of the given frame is displayed.

For sequential frames, the extraction, up-rendering, shutter setting, and displaying operations alternate between the left eye image and the right eye image, such that for a given frame only the left eye image portion or the right eye image portion is processed, with the next frame having the other of the left eye image portion or right eye image portion processed, and so on. With a normal frame rate, the processing of only the left eye image portion or right eye image portion of a given frame in an alternating manner is not discernable to the human optic system, and provides for improved efficiency in processing the three-dimensional video stream.

In other embodiments, cameras may be provided separately from the HMD or the smartphone. The cameras can be directed toward the HMD to track the HMD. In some embodiments, combinations of cameras, which may include cameras on the HMD, cameras on the phone, and cameras viewing the HMD (e.g., as connected to a computer) may be used together. As such, it should be understood that the embodiments or parts of the embodiments described with reference to FIGS. 1A-7 may be combined with parts, components, features or embodiments described with reference to FIGS. 8-12, to define various hybrid embodiments.

With the foregoing in mind, additional embodiments are described with reference to FIGS. 8-12.

In one example, the HMD worn by a user provides the user access to view rich multimedia content, which can include video games, movies, internet content, and other types of interactive and non-interactive content. The tracking of the HMD is performed using a combination of systems. The systems include, without limitation, inertial sensors in the HMD and optical tracking using one or more cameras. A camera used in optical tracking can capture video of the user wearing the HMD, so when the user moves around with the HMD the video frames can be analyzed to determine position, orientation and movements of the HMD. Broadly speaking, some content presented by the HMD is dynamically dependent on movement of the HMD.

For example, if the HMD provides a view into a scene, the user is able to naturally move his or her head to view other parts of the scene. In a video gaming example, a user wearing the HMD can move his or her head in any direction to move about in and around a virtual scene. In one embodiment, the virtual scene is rendered in a rich three dimensional (3D) format. Consequently, in order to smoothly render content in the HMD, the movement of the HMD will be tracked with high fidelity.

Figure 8A:
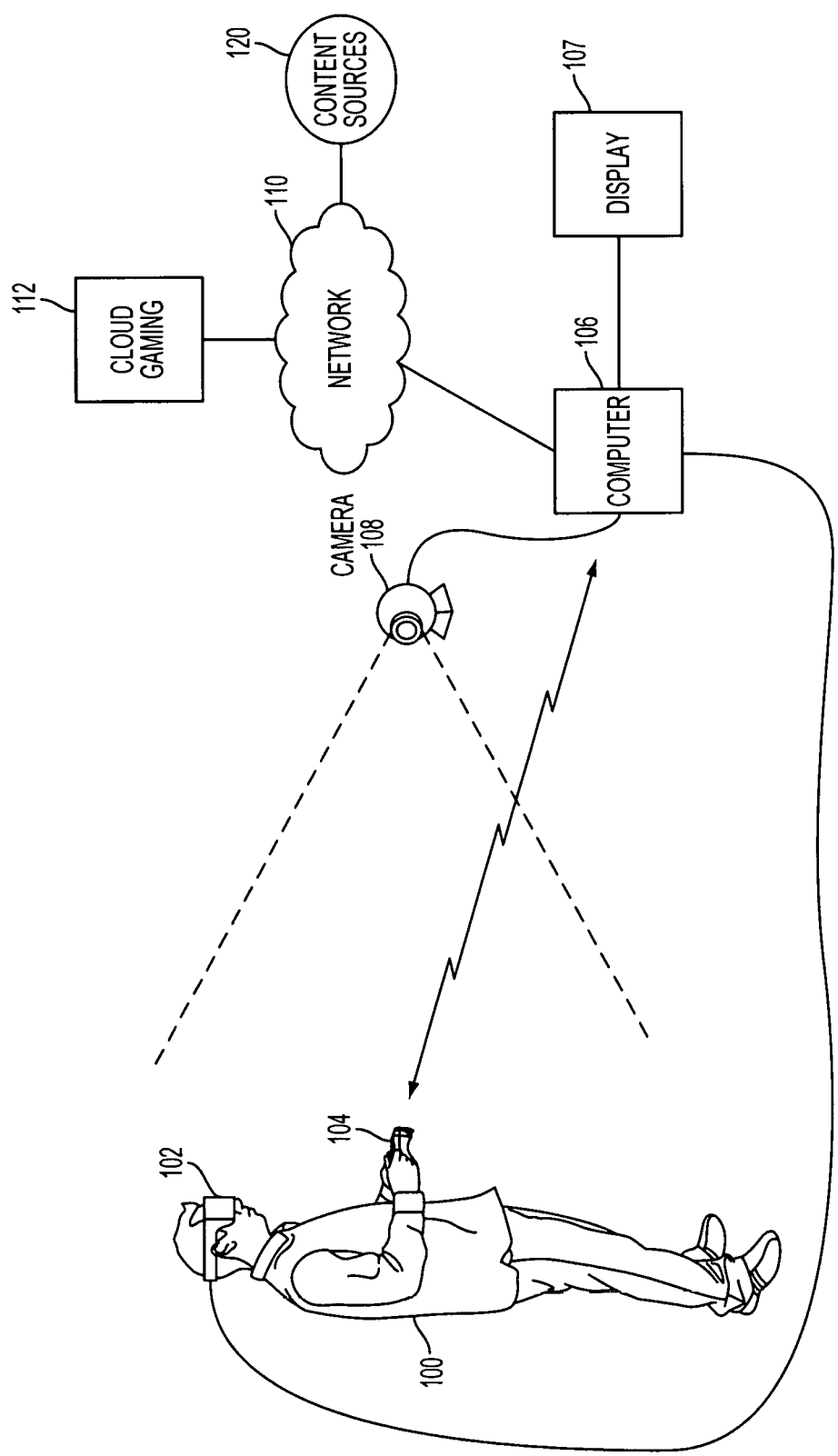
FIG. 8A illustrates an example of a user wearing an HMD, interfacing with a computing device and a camera used for tracking, in accordance with one embodiment.
Figure 8B:
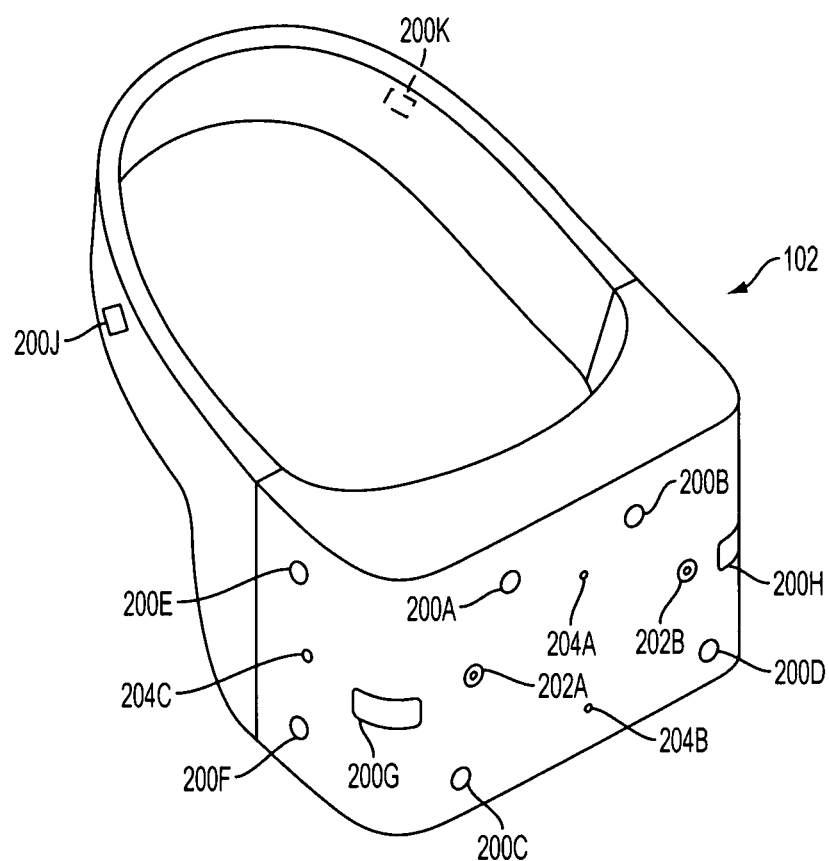
FIG. 8B illustrates a plurality of LEDs that can be used for camera tracking, and in some cases, photo diodes can be integrated onto the surface of the housing to provide tracking using a laser or light emitting source(s), in accordance with one embodiment.

In one configuration of an HMD, shown in FIGS. 8A and 8B, is configured to communicate with a client system 106, which renders the content presented to the HMD. The content (e.g., game, movie, video, audio, images, multimedia, etc.), in some embodiments may be streamed from a remote server or servers using cloud gaming infrastructure. In some examples, the content is downloaded to the client system 106 for rendering and then transferred to the HMD.

As noted above, the tracking may include the use of inertial sensors that are disposed within the HMD. Example inertial sensors include one or more accelerometers and one or more gyroscopes. Some implementations may include more or less inertial sensors. In addition to inertial sensors, the HMD can be tracked using a camera. The HMD is, in one embodiment, configured with several lights (e.g., light emitting diodes (LEDs)), which act as markers. The markers can then be easily identified by analyzing, by the client system, one or more video frames captured by the camera. In one configuration, the HMD includes four LEDs on the four corners of the front unit (e.g., also referred to herein as the optics block) and two LEDs on the rear section.

The front unit 102a, in one example, includes a front face and a side face on each side, wherein the front face and side faces define a substantially continuous surface. In various examples provided herein, the front LEDs are defined in a housing of the front unit 102a, and disposed with transparent plastic that can illuminate when the LEDs are turned on. Further, in some embodiments, the front LEDs are configured to be partially disposed on the front surface and partially on the side surface, to define a partial L-shape, or curved L-shape, or boomerang shape, or a curved rectangle, or curved line, or a spot, or circle, or a pattern, or combinations thereof.

This shape allows for tracking of the front unit 102a when the user is directly facing the camera 108 and when the user starts to turn away from direct facing of the camera 108. As the user faces to the side and further away from the directly facing the camera, the front LEDs will be visible until only the LEDs on one side of the front are visible and one of the LEDs on the backside are visible. This is the transition from the front LEDs to the front and back LEDs. Due to this transition, as noted above, the separation distance between the front and back LEDs is needed, so that accurate tracking can proceed.

Still further, when the user wearing the HMD is facing the camera, the camera should be able to view all four LEDs. The separation of the four front LEDs is known to the client system 106. For example, a geometric model of the HMD can be accessed by programs executed on the client system 106, to determine depth (relative to the camera) and orientation of the user's head when wearing the HMD. For instance, because the four LEDs are, in one embodiment, disposed on the corners (e.g., outlining a rectangular shape), it is possible to determine from the captured video frames if the user is viewing down, up or to the sides.

However, because the interactive content that can be rendered in the HMD can be virtually boundless, a user is able to view and interact with the virtual scene in most every dimension. A user wearing an HMD, therefore, may decide to turn his or her head in any direction, which is not necessarily always forward facing with respect to the camera. In fact, depending on the content rendered (e.g., immersive interactive video games, moves, virtual tours, clips, audio, and combinations thereof), users will many times be facing to the sides of the camera and directly away from the camera.

During such interactive sessions, the camera tracking the HMD will go from seeing the front four LEDs to sometimes seeing the side of two of the front LEDs and also one of the rear LEDs. Although the front four LEDs remain in a fixed relative orientation, based on the geometric model of the HMD, the rear LEDs may change in position depending on an adjusted setting of a headband of the HMD. For instance, if a user with a smaller head adjusts the headband to fit, the distance between the front LEDs and the rear LED (e.g., when viewed from the side) will be closer, relative to an adjusted setting for a larger head of another user.

To account for the changes in headband adjustments, a process is configured to calibrate the geometric model of the HMD, so that the separation between the front LEDs and the rear LED (e.g., when viewed from the side when the user turns his or her head away from normal to the camera) can be used to accurately render scene content to the HMD and provide the scenes from the desired perspective, angle and/or orientation. In one implementation, the geometric model is a computer model, which stores/contains dimensions and/or three-dimensional outlines of the HMD 102, similar to what a computer aided design (CAD) drawing may show. However, the geometric model is not displayed as a drawing, but instead is stored as a data set, that is accessible by games, or movies, or software, or firmware, or hardware, or combinations thereof to enable accurate tracking.

Still by way of example, the three-dimensional outlines of the HMD 102 can include, in one embodiment, outlines of each shape of the HMD and the shapes of the LED regions, the locations of the LEDs relative to shapes in the outline, the angles and contours of the physical structures of the HMD, and data sets that define measurements of the features and constructs of the HMD. In particular, the geometric model may include dimensional data that define the exact relative placement of the LEDs on the front unit 102a. However, because the rear LEDs are coupled to a headband that is adjustable, the separate distance must be updated during calibration, so that the geometric model can be updated with a more accurate distance between the front and rear LEDs.

In one embodiment, the calibration process is configured to initiate after analysis of the video frames determines that one of the rear LEDs is visible (e.g., starting from when only the front LEDs are visible). For example, at the start of a session (e.g., game play or interactive session), it is common that the user will face the HMD toward the camera. At some point, the user will turn his head away from the camera, which will expose at least one of the rear LEDs. At this point, the analysis of the video frames, which is ongoing, will detect the appearance of the rear LED.

In one embodiment, the process will analyze several frames as the user continues to move to associate the visible rear LED and the visible front LEDs with inertial data. The inertial data present for each frame, for example, is used to associate an estimated separation distance between the visible rear LED and the visible front LEDs. In one example, gyroscope data from the HMD is used to determine the rotation motion by the user's head, as the HMD moves. Further, by way of example, accelerometer data from the HMD is used to determine movement, such as position (e.g., tilt/pitch) and rotation.

Thus, using the image data from the captured video frames of the HMD (i.e., when the rear and front LEDs are visible), the inertial data in combination with the image data will render an estimated separation distance between the front LEDs and the rear LED, for the current size setting of the headband of the HMD. This data is then used to calibrate the geometric model of the HMD, which includes the estimated separation distance. In one embodiment, the calibration can be updated from time to time, and can also be calibrated independently for each side of the HMD.

Once the calibration to the geometric model of the HMD is complete, the user may proceed to interact during the session. However, once the session is done, it is possible that a different user may wish access to the HMD. At such time, it is also likely that the new user will adjust the headband of the HMD to another size, which will cause a change in the actual separation distance between the front LEDs and the rear LEDs. In one embodiment, a new session can begin, using either the prior updated calibration or the dimensions from the original geometric model.

At the start, the game play or interactive session will proceed smoothly, wherein the scene presented in the HMD will render based on movements in the user's head. This will be so, while the user wearing the HMD is facing forward toward the camera, wherein the fixed separation between the four LEDs in the front of the HMD are known. However, once the user turns away from the camera and the rear LED is found, the system, without automatic calibration, would see a jump or pop in the content rendered in the HMD. This is so, as the tracking of the HMD, which utilizes marker tracking of the LEDs to identify position, would be out of sync with the true position of the HMD.

In one embodiment, a determination as to whether re-calibration is needed is performed each time the user faces the HMD to the side, wherein the front and rear LEDs become visible (i.e., coming from when only the front or only the rear LEDs are visible). In one example, if the calibration occurred for a current session, and the session is on-going with a current calibration, the system will run a calibration in the background to determine if the current calibration is still within a pre-defined tolerance margin. For example, if the same user adjusted the headband during game play, or took off the HMD for a minor size adjustment, or some other person tried on the HMD momentarily, then the actual separation between the front and the rear would be different than what was used to estimate the separation during an initial calibration.

The tolerance margin is configured or chosen so that if the new background calibration shows that rendering glitches, skips or pops would likely occur (e.g., in the video images rendered in the HMD), then the new calibration should become the current calibration.

In still another embodiment, the HMD will include a headband adjustment detector that will set a flag. The flag can be read by the system and/or game executing, which can be used to require recalibration of the geometric model. For instance, if the user adjusts the headband during use of the HMD, the system can be alerted via the flag that the calibration should be re-run. The same may be true if the adjustment occurred because another user tried on the HMD, even if the same session is in progress. In still further embodiments, a flag can be generated upon the start of a new session or when the system detects that the HMD has been still or has not moved for some time. Such indicators can be viewed as a possibility that the headband may have been adjusted, before the new session occurred or even during a session.

FIG. 8A illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms (e.g., optics and display screens) in close proximity to the user's eyes and the format of the content delivered to the HMD. In one example, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer, including but not limited to, a gaming console, personal computer, laptop, tablet computer, mobile device, cellular phone, tablet, thin client, set-top box, media streaming device, etc. In some embodiments, the HMD 102 can connect directly to the internet, which may allow for cloud gaming without the need for a separate local computer. In one embodiment, the computer 106 can be configured to execute a video game (and other digital content), and output the video and audio from the video game for rendering by the HMD 102. The computer 106 is also referred to herein as a client system 106a, which in one example is a video game console.

The computer may, in some embodiments, be a local or remote computer, and the computer may run emulation software. In a cloud gaming embodiment, the computer is remote and may be represented by a plurality of computing services that may be virtualized in data centers, wherein game systems/logic can be virtualized and distributed to user over a network.

The user 100 may operate a controller 104 to provide input for the video game. In one example, a camera 108 can be configured to capture image of the interactive environment in which the user 100 is located. These captured images can be analyzed to determine the location and movements of the user 100, the HMD 102, and the controller 104. In one embodiment, the controller 104 includes a light (or lights) which can be tracked to determine its location and orientation. Additionally, as described in further detail below, the HMD 102 may include one or more lights which can be tracked as markers to determine the location and orientation of the HMD 102 in substantial real-time during game play.

The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some embodiments, computer 106 can execute games locally on the processing hardware of the computer 106. The games or content can be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and execute the video game being played by the user 100. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera 108 may be wired or wireless. In some embodiments, content executed on the HMD 102 or displayable on a display 107, can be obtained from any content source 120. Example content sources can include, for instance, internet websites that provide downloadable content and/or streaming content. In some examples, the content can include any type of multimedia content, such as movies, games, static/dynamic content, pictures, social media content, social media websites, etc.

As will be described below in more detail, a player 100 may be playing a game on the HMD 102, where such content is immersive 3D interactive content. The content on the HMD 102, while the player is playing, can be shared to a display 107. In one embodiment, the content shared to the display 107 can allow other users proximate to the player 100 or remote to watch along with the user's play. In still further embodiments, another player viewing the game play of player 100 on the display 107 may participate interactively with player 100. For example, a user viewing the game play on the display 107 may control characters in the game scene, provide feedback, provide social interaction, and/or provide comments (via text, via voice, via actions, via gestures, etc.,) which enables users that are not wearing the HMD 102 to socially interact with player 100, the game play, or content being rendered in the HMD 102.

FIG. 8B illustrates a head-mounted display (HMD), in accordance with an embodiment of the invention. As shown, the HMD 102 includes a plurality of lights 200A-H, J and K (e.g., where 200K and 200J are located toward the rear or backside of the HMD headband). Each of these lights may be configured to have specific shapes and/or positions, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102.

Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device. In some embodiments, inertial sensors are disposed in the HMD 102, which provide feedback regarding positioning, without the need for lights. In some embodiments, the lights and inertial sensors work together, to enable mixing and selection of position/motion data.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102.

Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras or a single camera can be installed on the HMD 102, and oriented in any direction. For example, in another embodiment, there may be cameras mounted on the sides of the HMD 102 to provide additional panoramic image capture of the environment.

Figure 9:
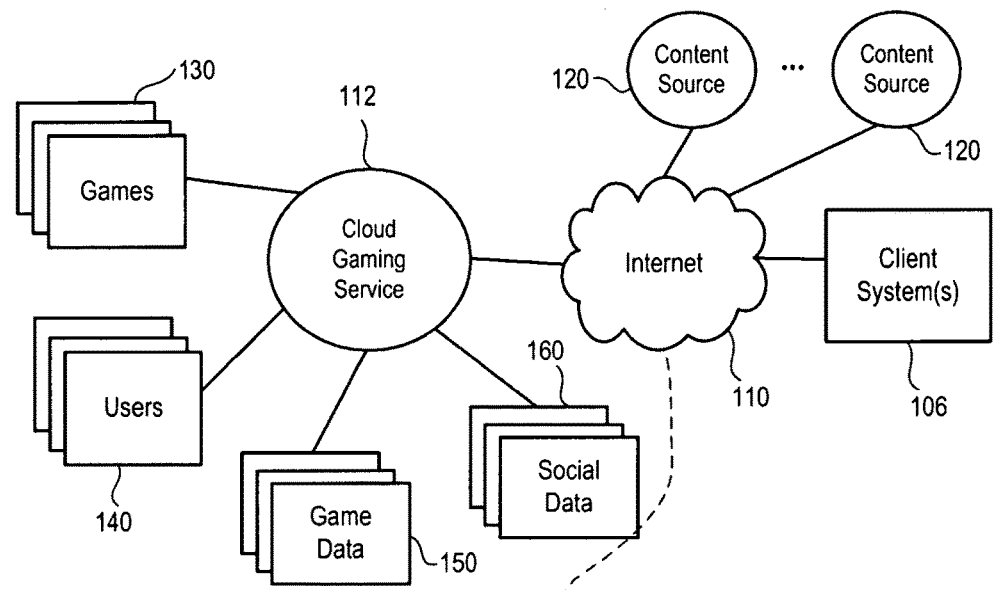
FIG. 9 illustrates one example of gameplay using the client system.
Figure 9:
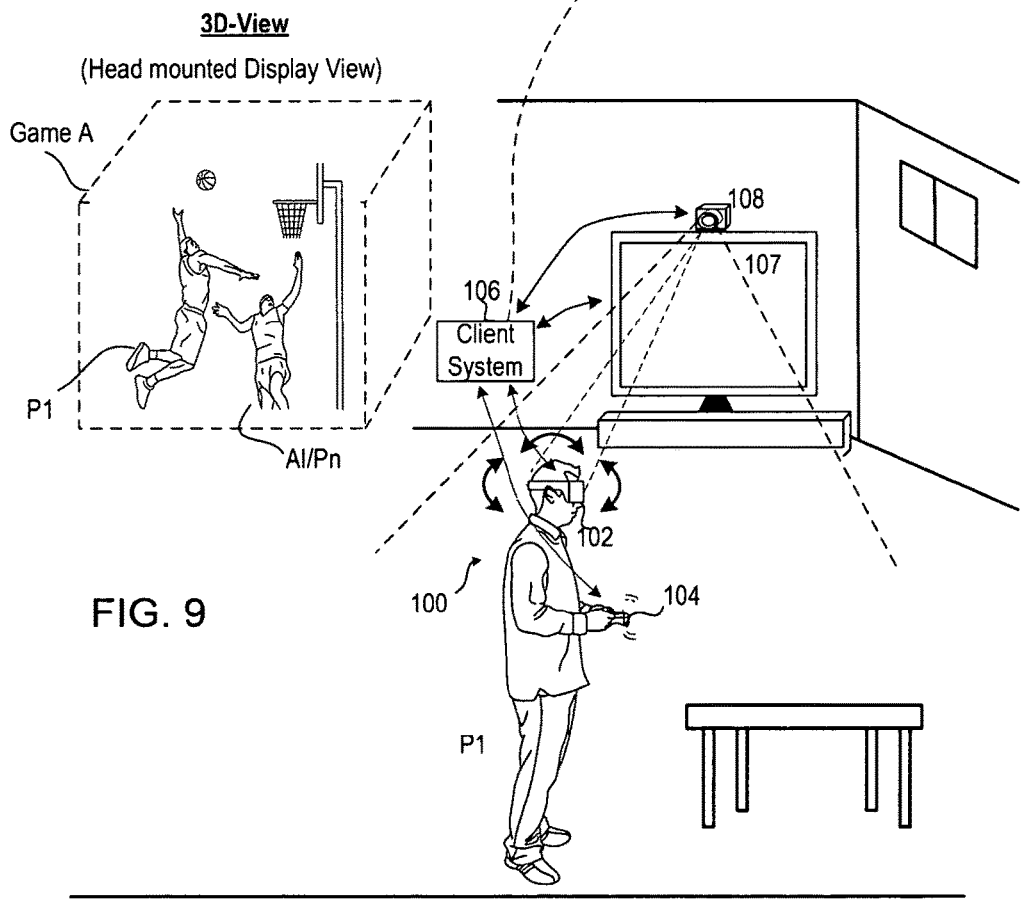

FIG. 9 illustrates one example of gameplay using the client system 106 that is capable of rendering the video game content to the HMD 102 of user 100. In this illustration, the game content provided to the HMD is in a rich interactive 3-D space. As discussed above, the game content can be downloaded to the client system 106 or can be executed in one embodiment by a cloud processing system. Cloud gaming service 112 can include a database of users 140, which are allowed to access particular games, share experiences with other friends, post comments, and manage their account information.

The cloud gaming service can also store game data 150 for specific users, which may be usable during gameplay, future gameplay, sharing to a social media network, or for storing trophies, awards, status, ranking, etc. Social data 160 can also be managed by cloud gaming service 112. The social data can be managed by a separate social media network, which can be interfaced with cloud gaming service 112 over the Internet 110. Over the Internet 110, any number of client systems 106 can be connected for access to the content and interaction with other users.

Continuing with the example of FIG. 9, the three-dimensional interactive scene viewed in the HMD can include gameplay, such as the characters illustrated in the 3-D view. One character, e.g. P1 can be controlled by the user 100 that is wearing the HMD 102. This example shows a basketball scene between two players, wherein the HMD user 100 is dunking a ball on another character in the 3-D view. The other character can be an AI (artificial intelligence) character of the game, or can be controlled by another player or players (Pn). User 100, who is wearing the HMD 102 is shown moving about in a space of use, wherein the HMD may move around based on the user's head movements and body positions. The camera 108 is shown positioned over a display screen in the room, however, for HMD use, the camera 108 can be placed in any location that can capture images of the HMD 102. As such, the user 102 is shown turned at about 90 degrees from the camera 108 and the display 107, as content rendered in the HMD 102 can be dependent on the direction that the HMD 102 is positioned, from the perspective of the camera 108. Of course, during HMD use, the user 100 will be moving about, turning his head, looking in various directions, as may be needed to take advantage of the dynamic virtual scenes rendered by the HMD.

Figure 10:
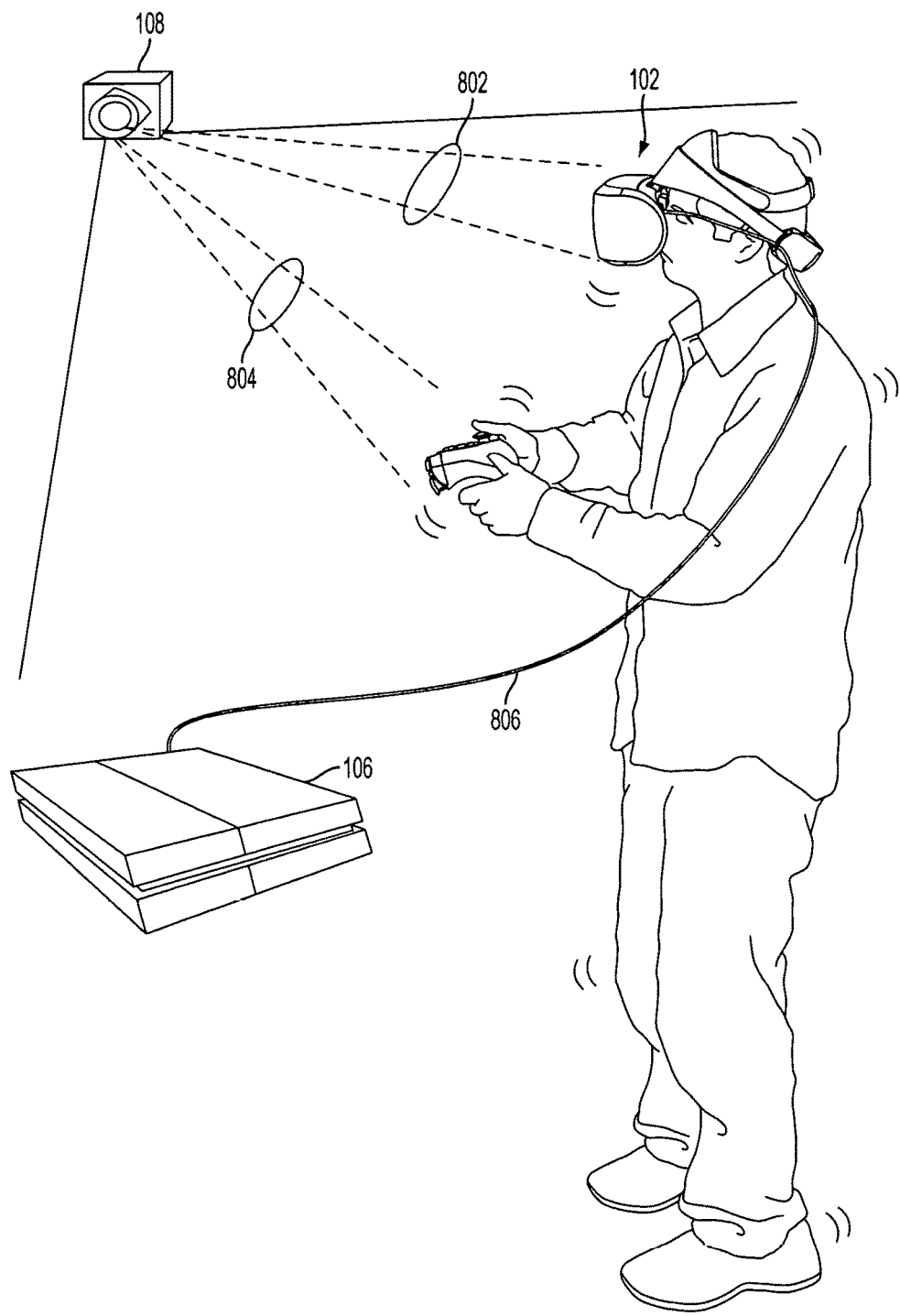
FIG. 10 illustrates an example of an HMD, tracking and play via a game console, in accordance with one embodiment.

FIG. 10 illustrates a user wearing the HMD 102, during use, in accordance with one embodiment. In this example, it is shown that the HMD is tracked 802 using image data obtained from captured video frames by the camera 108. Additionally, it is shown that the controller can also be tracked 804 using image data obtained from captured video frames by the camera 108. Also shown is the configuration where the HMD is connected to the computing system 106 via a cable 806. In one embodiment, the HMD obtains power from the same cable or can connect to another cable. In still another embodiment, the HMD can have a battery that is rechargeable, so as to avoid extra power cords.

Figure 11:
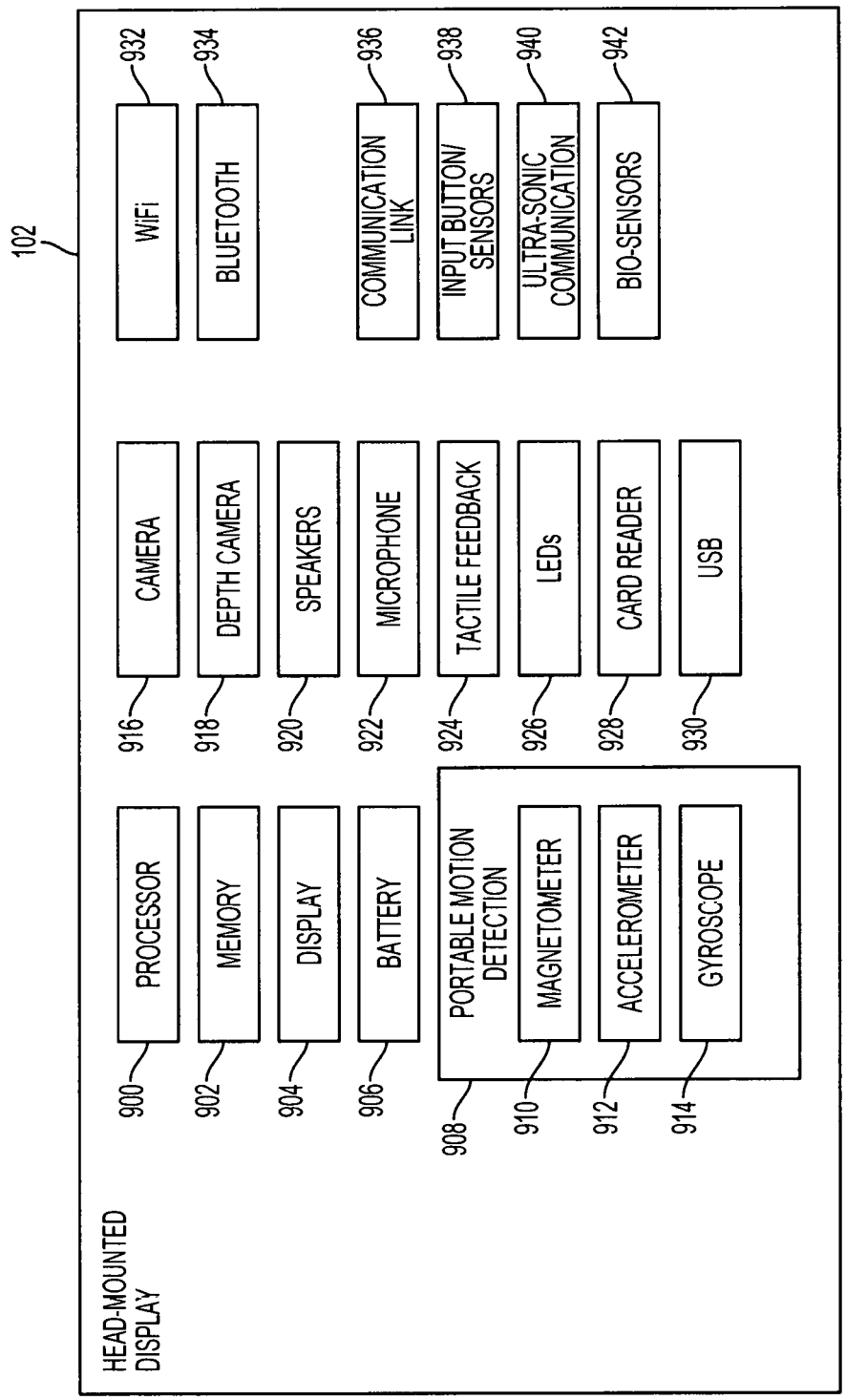
FIG. 11 illustrates example electronics that can be made part of the housing or HMD system, in accordance with one embodiment.

With reference to FIG. 11, a diagram is shown illustrating example components of a head-mounted display 102, in accordance with an embodiment of the invention. It should be understood that more or less components can be included or excluded from the HMD 102, depending on the configuration and functions enabled. The head-mounted display 102 may include a processor 900 for executing program instructions. A memory 902 is provided for storage purposes, and may include both volatile and non-volatile memory. A display 904 is included which provides a visual interface that a user may view.

The display 904 can be defined by one single display, or in the form of a separate display screen for each eye. When two display screens are provided, it is possible to provide left-eye and right-eye video content separately. Separate presentation of video content to each eye, for example, can provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, can be the left-eye video feed, but in other embodiments it can be the right-eye video feed.

A battery 906 may be provided as a power source for the head-mounted display 102. In other embodiments, the power source can include an outlet connection to power. In other embodiments, an outlet connection to power and a battery 906 may be provided. A motion detection module 908 may include any of various kinds of motion sensitive hardware, such as a magnetometer 910, an accelerometer 912, and a gyroscope 914.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 912 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 910 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 912 is used together with magnetometer 910 to obtain the inclination and azimuth of the head-mounted display 102.

A gyroscope is a device for measuring or maintaining orientation, based on the principles of angular momentum. In one embodiment, three gyroscopes 914 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 916 is provided for capturing images and image streams of a real environment. More than one camera (optionally) may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 918 may be included in the head-mounted display 102 for sensing depth information of objects in a real environment.

The head-mounted display 102 includes speakers 920 for providing audio output. Also, a microphone 922 may be included for capturing audio from the real environment, including sounds from the ambient environment, speech made by the user, etc. The head-mounted display 102 includes tactile feedback module 924 for providing tactile feedback to the user. In one embodiment, the tactile feedback module 924 is capable of causing movement and/or vibration of the head-mounted display 102 so as to provide tactile feedback to the user.

LEDs 926 are provided as visual indicators of statuses of the head-mounted display 102. For example, an LED may indicate battery level, power on, etc. A card reader 928 is provided to enable the head-mounted display 102 to read and write information to and from a memory card. A USB interface 930 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 932 may be included for enabling connection to the Internet via wireless networking technologies. Also, the head-mounted display 102 may include a Bluetooth module 934 for enabling wireless connection to other devices. A communications link 936 may also be included for connection to other devices. In one embodiment, the communications link 936 utilizes infrared transmission for wireless communication. In other embodiments, the communications link 936 may utilize any of various wireless or wired transmission protocols for communication with other devices.

Input buttons/sensors 938 are included to provide an input interface for the user. Any of various kinds of input interfaces may be included, such as buttons, gestures, touchpad, joystick, trackball, etc. An ultra-sonic communication module 940 may be included in head-mounted display 102 for facilitating communication with other devices via ultra-sonic technologies.

Bio-sensors 942 are included to enable detection of physiological data from a user. In one embodiment, the bio-sensors 942 include one or more dry electrodes for detecting bio-electric signals of the user through the user's skin, voice detection, eye retina detection to identify users/profiles, etc.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous players (e.g., P1, P2, . . . Pn). Each of these players may receive or share a video stream, or a single video stream may include regions of a frame generated specifically for each player, e.g., generated based on each player's point of view. Any number of clients can be local (e.g., co-located) or are geographically dispersed. The number of clients included in a game system may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD can be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content can be rendered so long as it can be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic can produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 12:
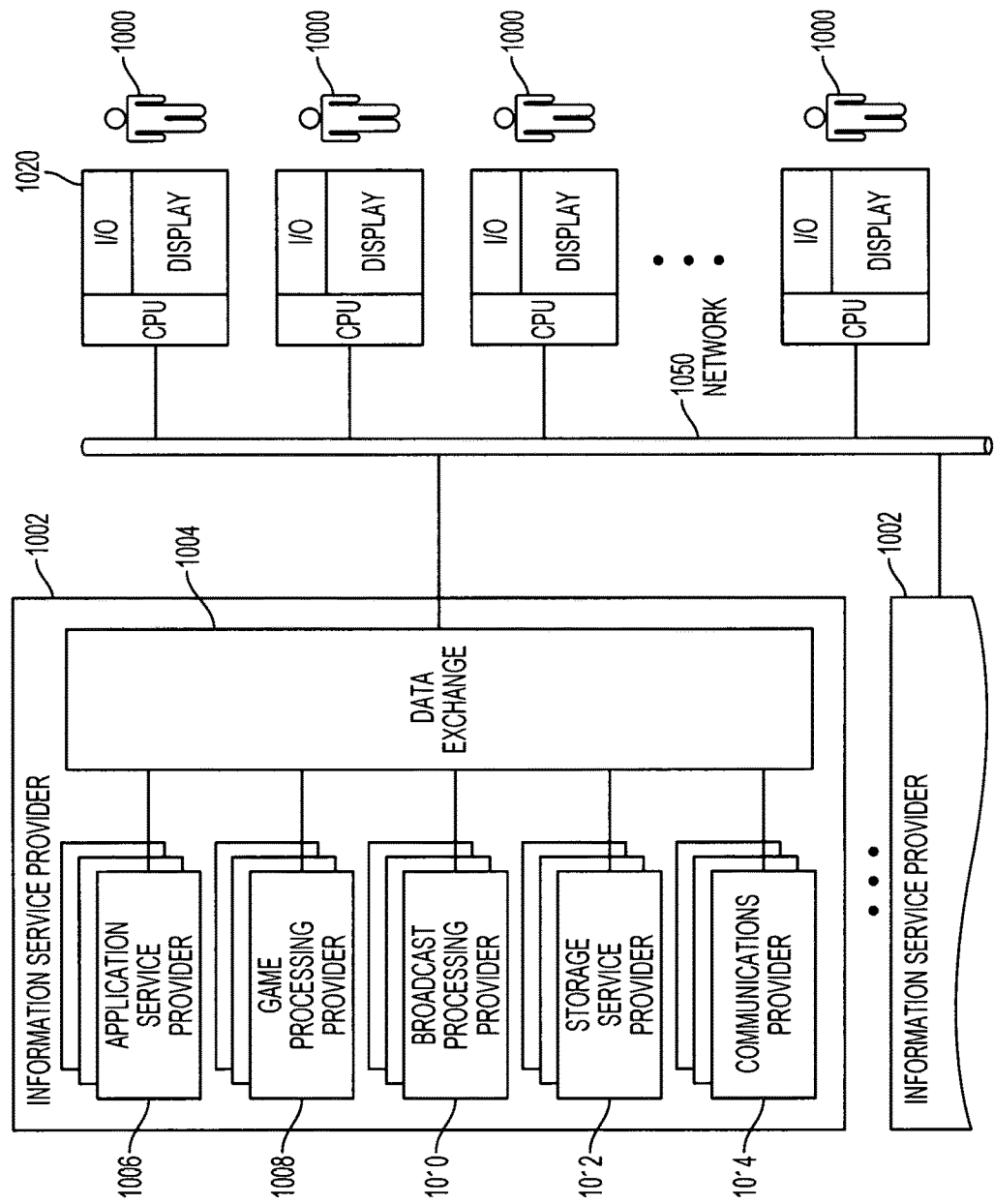
FIG. 12 provides an example of a datacenter and access to interface with multiple users, e.g., via a network for multi-player interaction, communication and/or play, in accordance with one embodiment.

FIG. 12 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the claims.

What is claimed is:

1. A system for rendering virtual reality content, comprising:
   a housing to be attached to a head of a user using a strap that connects to the housing;
   display optics integrated in the housing, the display optics oriented on an internal side of the housing that is configured for orientation toward eyes of the user when the housing is attached to the head of the user;
   electronics integrated with the housing;
   a holder integrated in the housing, the holder is configured to retain a smartphone, wherein when the smartphone is retained by the holder a screen of the smartphone is oriented toward the display optics of the housing; and
   a connector integrated in the housing to enable connection of the smartphone to the electronics when the smartphone is retained by the holder;
   wherein the smartphone includes a camera facing away from the display optics, the screen of the smartphone is configured to render images of a virtual reality (VR) space that is viewable through the display optics, wherein a program executed by the smartphone is configured to enable the camera to provide a pass-through view of a real world environment, the pass-through view providing images of the real world environment instead of the VR space, the smartphone further includes an inertial sensor for detecting movements of the smartphone;
   wherein the electronics of the housing further include an inertial sensor for detecting movements of the housing, the movements of the housing and the movements of the smartphone are usable together by the program executed by the smartphone to change views into the VR space in response to the movements.

2. The system of claim 1, wherein the program executed by the smartphone is configured to trigger the pass-through view in response to user input to the electronics of the housing that communicate to the smartphone via the connector.

3. The system of claim 1, wherein the program executed by the smartphone is configured to trigger the pass-through view in response to detection of an object in the real world environment that the user is approaching.

4. The system of claim 1, wherein the program executed by the smartphone is configured to provide a warning to the user before triggering the pass-through view.

5. The system of claim 4, wherein the warning is communicated to the user via one or more of a message, a notification, an alarm, a sound, tactile feedback, or a combination of two or more thereof.

6. The system of claim 1, wherein the pass-through view is one of a partially transparent view, a fully transparent view, a blend of fully and partially transparent views.

7. The system of claim 1, wherein the connector is a USB connector.

8. The system of claim 1, wherein the inertial sensor of the housing or of the smartphone is defined from one or more of an accelerometer and a magnetometer.

9. The system of claim 1, further comprising,
a housing camera, the housing camera is integrated with the housing.

10. The system of claim 9, wherein the camera and the housing camera are configured to work together to provide depth information of the real world environment when viewed via the pass-through view.

11. The system of claim 9, wherein the housing camera is a depth camera to provide depth information of objects in the real world environment when viewed via the pass-through view.

12. The system of claim 1, wherein the housing includes a plurality of light emitting diodes exposed from a surface of the housing, the light emitting diodes used for tracking position of the housing using at least one external camera that directionally faces the housing.

13. The system of claim 1, wherein the housing includes a plurality of photo diodes disposed on a surface of the housing, the photo diodes used for tracking position of the housing using at least one light emitting device positioned in a space where the housing is to be tracked.

14. The system of claim 1, further comprising,
a network interface integrated with the smartphone, the network interface providing access to the network for connecting to an internet site having digital content, the digital content being one of streaming content or interactive streaming content, wherein the streaming interactive content is to be rendered by the smartphone for display via the optics of the housing.

15. The system of claim 1, further comprising,
a network interface integrated with the housing, the network interface providing access to the network for connecting to an internet site having digital content, the digital content being one of streaming content or interactive streaming content, wherein the streaming interactive content is to be rendered by the smartphone for display via the optics of the housing.

16. The system of claim 1, wherein the housing includes a device input that communicates with the electronics, the device input configured for receiving user input for controlling or providing input to at least part of an interactive content scene rendered in image data generated by the smartphone.

17. The system of claim 1, wherein user input is via a controller, or a hand gesture, or a touch gesture, or voice control, or a combination thereof.

18. A method for execution by a virtual reality system used for rendering virtual reality content, the system including a housing to be attached to a head of a user using a strap that connects to the housing and display optics integrated in the housing, the display optics are oriented on an internal side of the housing that is configured for orientation toward eyes of the user when the housing is attached to the head of the user, comprising,
the housing having electronics integrated therein;
the housing includes a holder for retaining a smartphone, wherein when the smartphone is retained by the holder a screen of the smartphone is oriented toward the display optics of the housing, the smart phone being configured to be connected to the housing via a connector;
accessing a camera of the smartphone, the camera is configured to face away from the display optics;
executing a program by the smartphone to render images of a virtual reality (VR) scene, the images being viable through the display optics; and
executing a pass-through view by the program of the smartphone, the pass-through view showing content from a real world environment instead of the VR scene;
executing an inertial sensor of the smartphone, the inertial sensor of the smartphone used for detecting movements of the smartphone;
executing an inertial sensor of the electronics, the inertial sensor used for detecting movements of the housing, the movements of the housing and the smartphone used together by the program executed by the smartphone to change views into the VR scene in response to the movements.

19. The method of claim 18, wherein the program executed by the smartphone is configured to trigger the pass-through view in response to user input to the electronics that communicate with the smartphone via the connector.

20. The method of claim 18, wherein the program executed by the smartphone is configured to trigger the pass-through view in response to detection of an object in the real world environment that the user is approaching.

21. The method of claim 18, wherein the program executed by the smartphone is configured to provide a warning to the user before triggering the pass-through view.

22. The method of claim 21, wherein the warning is communicated to the user via one or more of a message, a notification, an alarm, a sound, tactile feedback, or a combination of two or more thereof.

23. The method of claim 18, wherein the pass-through view is one of a partially transparent view, a fully transparent view, a blend of fully and partially transparent views.

24. The method of claim 18, further comprising,
using a plurality of light emitting diodes exposed from a surface of the housing for tracking position of the housing using at least one external camera that directionally faces the housing.

25. The method of claim 18, further comprising,
using a plurality of photo diodes disposed on a surface of the housing for tracking position of the housing using at least one light emitting device positioned in a space where the housing is to be tracked.

* * * * *